(12) United States Patent
Eneev et al.

(10) Patent No.: US 11,703,351 B2
(45) Date of Patent: Jul. 18, 2023

(54) GENERATING A LOCAL MAPPING OF AN AGRICULTURAL FIELD FOR USE IN PERFORMANCE OF AGRICULTURAL OPERATION(S)

(71) Applicant: Mineral Earth Sciences LLC, Mountain View, CA (US)

(72) Inventors: Alan Eneev, Sunnyvale, CA (US); Jie Yang, Sunnyvale, CA (US); Yueqi Li, San Jose, CA (US); Yujing Qian, Mountain View, CA (US); Nanzhu Wang, San Jose, CA (US); Sicong Wang, Fremont, CA (US); Sergey Yaroshenko, Newark, CA (US)

(73) Assignee: MINERAL EARTH SCIENCES LLC, Mountain View, CA (US)

( * ) Notice: Subject to any disclaimer, the term of this patent is extended or adjusted under 35 U.S.C. 154(b) by 0 days.

(21) Appl. No.: 17/131,098

(22) Filed: Dec. 22, 2020

(65) Prior Publication Data

US 2022/0196433 A1 Jun. 23, 2022

(51) Int. Cl.
*G01C 21/00* (2006.01)
*G05D 1/02* (2020.01)
(Continued)

(52) U.S. Cl.
CPC ..... *G01C 21/3848* (2020.08); *G01C 21/3826* (2020.08); *G01S 19/42* (2013.01);
(Continued)

(58) Field of Classification Search
CPC ............ G01C 21/3848; G01C 21/3826; G06V 20/188; G01S 19/42; G01S 19/01; G05D 1/0011; G05D 1/0038; G05D 1/0212; G05D 1/00; G05D 1/02; G08G 5/00; G08G 5/04; B64B 1/40; A01M 9/00; B64D 1/16;
(Continued)

(56) References Cited

U.S. PATENT DOCUMENTS 10,885,386 B1 * 1/2021 Evans ................. G06K 9/6256
2014/0032346 A1 * 1/2014 Hong .................... G07F 7/0886
705/16

(Continued)

*Primary Examiner* — Jeffrey C Boomer
*Assistant Examiner* — Terry C Buse
(74) *Attorney, Agent, or Firm* — Gray Ice Higdon

(57) ABSTRACT

Implementations are directed to assigning corresponding semantic identifiers to a plurality of rows of an agricultural field, generating a local mapping of the agricultural field that includes the plurality of rows of the agricultural field, and subsequently utilizing the local mapping in performance of one or more agricultural operations. In some implementations, the local mapping can be generated based on overhead vision data that captures at least a portion of the agricultural field. In these implementations, the local mapping can be generated based on GPS data associated with the portion of the agricultural field captured in the overhead vision data. In other implementations, the local mapping can be generated based on driving data generated during an episode of locomotion of a vehicle through the agricultural field. In these implementations, the local mapping can be generated based on GPS data associated with the vehicle traversing through the agricultural field.

19 Claims, 11 Drawing Sheets

(51) Int. Cl.
  *G05D 1/00* (2006.01)
  *G01S 19/42* (2010.01)
  *G06V 20/56* (2022.01)
  *G06V 20/10* (2022.01)

(52) U.S. Cl.
  CPC ......... *G05D 1/0011* (2013.01); *G05D 1/0212* (2013.01); *G05D 1/0227* (2013.01); *G06V 20/188* (2022.01)

(58) Field of Classification Search
  CPC .. A01B 7/00; A01B 69/04; A01C 7/00; A01C 21/00; B64C 39/02
  See application file for complete search history.

(56) References Cited

U.S. PATENT DOCUMENTS

| | | |
|---|---|---|
| 2016/0157414 A1 | 6/2016 | Ackerman et al. |
| 2016/0307448 A1 | 10/2016 | Salnikov et al. |
| 2019/0204095 A1* | 7/2019 | Anderson ............ A01B 69/008 |
| 2020/0193589 A1* | 6/2020 | Peshlov ............... A01B 69/008 |
| 2020/0217830 A1* | 7/2020 | Shore .................. G06V 20/188 |
| 2020/0242749 A1* | 7/2020 | Hearst .................. G06V 20/17 |
| 2021/0102907 A1* | 4/2021 | Couture ............... G01N 23/203 |
| 2021/0192709 A1* | 6/2021 | Sibley .................. G06V 20/56 |

* cited by examiner

GENERATING A LOCAL MAPPING OF AN AGRICULTURAL FIELD FOR USE IN PERFORMANCE OF AGRICULTURAL OPERATION(S)

BACKGROUND

In areas of a field, agricultural conditions can rapidly change at a localized and regional level, with some changes resulting in healthier crops and other changes resulting in degradation of agricultural environments. In some instances, pests can damage certain areas of crops without warning or recognition by those persons tasked with overseeing such areas—and despite such pests typically having an observable origin. In other instances, crops can reap benefits from weather that is moving through a region, and such crops may be able to leverage certain benefits from the weather, at least with prior preparation relative to the weather.

Although overhead imagery (e.g., satellite imagery or drone imagery) can be helpful for monitoring these variations in an agricultural environment, this overhead imagery may lack precise data, e.g., at the individual row or plant level, which otherwise could be harnessed to increase agricultural yields. Further, many robots (also referred as "rovers") that are capable of monitoring these variations at the individual row or plant level in an agricultural environment perform localization using position coordinate sensors, such as global position system ("GPS") sensors. However, those persons tasked with overseeing such areas may not be able to readily identify the location of a given rover based on data generated by the GPS sensors if the rover alerts those persons to any issues with the crops at an individual row or plant level.

SUMMARY

Some implementations described herein relate to generating a local mapping of a plurality of rows of crops of an agricultural field based on overhead vision data capturing at least a portion of the agricultural field. The overhead vision data can be captured by vision component(s) that are associated with, for example, a drone, a satellite, an airplane, and/or any other vehicle or object having an overhead view of the agricultural field. The vision data can be analyzed to identify a plurality of rows of crops and/or a plurality of agricultural plots that each include multiple rows of crops from among the plurality of rows of crops. Notably, the plurality of agricultural plots may each include rows of crops. For example, a first agricultural plot may include 100 rows of corn, a second agricultural plot may include 100 rows of soybeans, a third agricultural plot may include 100 rows of wheat, and so on. In some implementations, analyzing the vision data may include, using a vision data processing model, to identify the plurality of rows of crops and/or the plurality of agricultural plots. In some additional or alternative implementations, analyzing the vision data may include receiving annotations from a human user that identifies the plurality of rows of crops and/or the plurality of agricultural plots.

The local mapping can be generated based on the plurality of rows and GPS data generated by GPS sensor(s) that capture GPS coordinates corresponding to the agricultural field. For example, a given portion of the GPS data can be associated with a given row, of the plurality of identified rows of crops, and/or a given plot, of the plurality of identified agricultural plots. In some implementations, the GPS data can be included in metadata that is associated with the vision data captured by the vision component(s). For example, the GPS coordinates can be embedded in the vision data that captures the portion of the agricultural field. In some additional or alternative implementations, the GPS data can be previously generated by the GPS sensor(s) and mapped to the vision data. For example, the GPS data can be generated by a GPS sensor of a vehicle (e.g., human operated or operated according to a robotic control policy) and/or a satellite, and can be stored in association with the agricultural field.

Some implementations described herein relate to generating a local mapping of a plurality of rows of crops of an agricultural field based on driving data generated during an episode of locomotion of a vehicle through the agricultural field. During the episode of locomotion of the vehicle, a trajectory of the vehicle can be identified. The trajectory can include, for example, a path of the vehicle that is traversed through the agricultural field. Further, GPS data generated by GPS sensor(s) of the vehicle can be obtained. The GPS data generated along the identified trajectory can be associated with a given row of the plurality of rows of crops. In some versions of those implementations, the vehicle can be operated by a user, whereas in other versions of those implementations, the vehicle is operated according to a robotic control policy.

In implementations where the vehicle is operated by the user, user input can be received that associates the GPS data along the identified trajectory with the given row. For example, the user can drive the vehicle along a trajectory that coincides with the given row. When the user reaches the end of the given row, the user input that indicates this trajectory should be associated with the given row, and the GPS data generated along the trajectory can be associated with the given row. This can be repeated for each of the plurality of rows until the plurality of rows are mapped. In implementations where the vehicle is operated according to a robotic control policy, the vehicle can identify a start of the given by analyzing vision data generated by vision component(s) of the vehicle. For instance, the vision data can be analyzed to determine where to begin storing the driving data that is associated with the given row where a first crop of the given row is identified. In those implementations, the vehicle can autonomously traverse through the agricultural field and along the given row, and can automatically associate the GPS data generated along the trajectory with the given row.

In various implementations, a corresponding semantic identifier can be assigned to each of the plurality of rows. Further, an additional corresponding semantic identifier can optionally be assigned to each the plurality of agricultural plots. In some versions of those implementations, the corresponding semantic identifiers can be automatically assigned to the plurality of rows (and optionally the agricultural plots) according to naming schema(s). The naming schema(s) can be based on strings or sequences of numbers and/or alphanumeric characters, cardinal directions, names of crops, landmarks, property boundaries, and/or other schema(s) for naming the rows and/or the agricultural plots. For example, assume an agricultural field has two agricultural plots that are side-by-side, and assume that a first one of the agricultural plots includes 100 rows of corn and a second one of the agricultural plots includes 100 rows of soybeans. In this example, the agricultural plots can be assigned the corresponding semantic identifiers of corn field and soybean field, the rows in the corn field can be assigned semantic identifiers of 1, 2, 3, 4, and so on for each of the 100 rows in the corn fields, and the rows in the soybean field can be assigned semantic identifiers of 1, 2, 3, 4, and so on for each of the 100 rows in the soybean fields. This enables the individual rows in the respective agricultural plots to be easily referenced by a user and/or system (e.g., corn field, row 53 or soybean field, row 29), as opposed to GPS coordinates or other position coordinates that reference the same row (e.g., longitudinal and latitudinal coordinates). In some additional or alternative versions of those implementations, the semantic identifiers for the rows and/or the agricultural plots can be assigned based on user input of a user that is received at a client device of the user.

In various implementations, and subsequent to generating the local mapping between the plurality of rows to the GPS data, the local mapping can be validated and/or updated. For instance, driving data of a vehicle can be generated during an episode of locomotion of the vehicle through the agricultural field. An additional local mapping between the plurality of rows traversed during the episode of locomotion and additional GPS data can be generated in a similar manner described above. The additional local mapping for a given row can be compared to a corresponding portion of the original local mapping for the given row. In some versions of those implementations, a difference between the additional local mapping and the original local mapping can be compared to a threshold. When the difference fails to satisfy a threshold, then the original local mapping can be validated as accurate. However, when the difference satisfies the threshold, the original local mapping may be updated. For example, the local mapping for the given row can be automatically updated based on the local mapping of the given row. As another example, a user may be notified of the difference via a client device, and the user can perform a corresponding action to correct the original local mapping for the given row.

In various implementations, and subsequent to generating the local mapping, the local mapping can be utilized in performance of agricultural operation(s). In some versions of those implementations, vision data generated by vision component(s) can be obtained. The vision data can include overhead imagery (e.g., from vision component(s) of a satellite, drone, airplane, and/or any other object or vehicle capable of capturing overhead imagery of the agricultural field) or ground imagery (e.g., from vision component(s) of a vehicle operated by a human and/or operated according to a robotic control policy). The vision data can be analyzed to identify an occurrence of an event associated with at least one row of the plurality of rows. The event can include, for example, a pest or weed infestation, crop destruction, crop wilting, crop flooding, and/or other events for which proactive measures can be taken by persons overseeing the crops. Further, a notification can be generated based on the local mapping and based on the identified event, and rendered at a client device of a user. For example, a notification of "Rows 97-103 of the West Corn Field are wilting" can be generated and rendered at the client device of the user. In some additional or alternative versions of those implementations, the user of the client device can query a system to navigate to a particular location in the agricultural field. For example, in response to receiving the notification of "rows 97-103 of the west corn field are wilting", assume the user goes to the west corn field. However, the user may not specifically know which rows of the west corn field are rows 97-103. Accordingly, the user may submit a query to the system of "where are rows 97-103 of the west corn field". In this example, the system can cause output to be presented to the user that indicates where rows 97-103 of the west corn field are in relation to the user (e.g., "keep walking forward for six more rows", "turn around and walk back two rows", etc.).

By using techniques described herein, one or more technological advantages may be achieved. As one non-limiting example, by subsequently utilizing the local mapping and the corresponding semantic identifiers thereof in performance of one or more agricultural operations, a user can easily identify locations where events have occurred in the agricultural field As a result, a quantity of user inputs received at one or more of the client devices 110 may be reduced since a user need not repeatedly query a system to identify a location where the event occurred, thereby conversing computational and/or network resources. For instance, by notifying a user that "corn stalks are wilting in rows 97-103 of NW corn field", the user knows the agricultural plot and the specific rows of the agricultural plot associated with the wilting corn stalks. In contrast, if the user was notified that "corn stalks are wilting at longitude and latitude coordinates<37.2431° N, 115.7930° W>", the user may then need to utilize one or more of the client devices 110 to query these coordinates one or more times to identify the location of these longitude and latitude coordinates within the agricultural field. As another non-limiting example, by subsequently utilizing the local mapping and the corresponding semantic identifiers thereof in performance of one or more agricultural operations, one or more of the agricultural operations may be performed in a more quick and efficient manner than if the local mapping was not available. For instance, by notifying a user that "corn stalks are wilting in rows 97-103 of NW corn field", the user knows the event that occurred and the location of where the event occurred. As a result, the user may cause one or more actions to be performed to address the identified event, which may result in a greater crop yield or higher quality crop yield.

The above description is provided as an overview of only some implementations disclosed herein. Those implementations, and other implementations, are described in additional detail herein.

DETAILED DESCRIPTION

Figure 1:
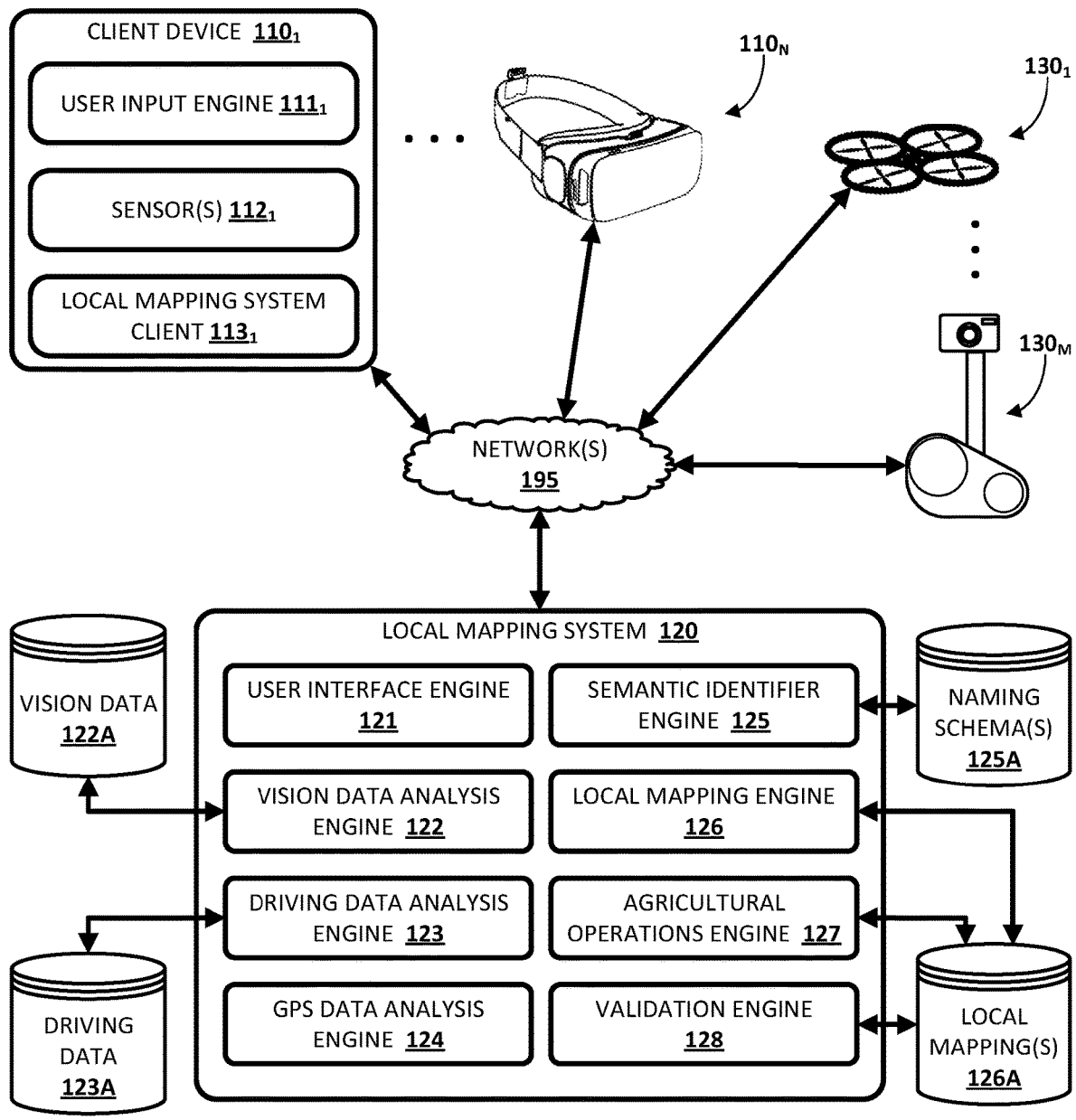
FIG. 1 depicts a block diagram of an example environment that demonstrates various aspects of the present disclosure, and in which implementations disclosed herein can be implemented.

Turning now to FIG. 1, an environment in which one or more selected aspects of the present disclosure may be implemented is depicted. The example environment includes a plurality of client devices $110_{1-N}$, a local mapping system 120, and a plurality of robots $130_{1-M}$. Each of components $110_{1-N}$, 120, and $130_{1-M}$ may communicate, for example, through a network 195. Local mapping system 120 is an example of an information processing and retrieval system in which the systems, components, and techniques described herein may be implemented and/or with which systems, components, and techniques described herein may interface.

In various implementations, an individual (which in the current context may also be referred to as a "user") may operate a client device 110 to interact with other components depicted in FIG. 1. Each component depicted in FIG. 1 may be coupled with other components through one or more networks 195, such as a local area network ("LAN") or wide area network ("WAN") such as the Internet. Each client device 110 may be, for example, a desktop computing device, a laptop computing device, a tablet computing device, a mobile phone computing device, a computing device of a vehicle of the participant (e.g., an in-vehicle communications system, an in-vehicle entertainment system, an in-vehicle navigation system), a standalone interactive speaker (with or without a display), or a wearable apparatus that includes a computing device, such as a head-mounted display ("HMD") that provides an augmented reality ("AR") or virtual reality ("VR") immersive computing experience, a "smart" watch, and so forth. Additional and/or alternative client devices may be provided.

Each client device 110 and local mapping system 120 may include one or more memories for storage of data and software applications, one or more processors for accessing data and executing applications, and other components that facilitate communication over one or more of the networks 195. The operations performed by client device 110 and/or local mapping system 120 may be distributed across multiple computer systems. For example, local mapping system 120 may be implemented as, for example, computer programs running on one or more computers in one or more locations that are coupled to each other through one or more of the networks 195.

Each client device 110 may operate a variety of different components that may be used, for instance, to generate or view a local mapping of an agricultural field and/or utilize the mapping in performance of one or more agricultural operations as described herein. For example, a first client device $110_1$ may include user input engine $111_1$ to detect and process user input (e.g., spoken input, typed input, and/or touch input) directed to the first client device $110_1$. As another example, the first client device $110_1$ may include a plurality of sensors $112_1$ to generate corresponding sensor data. The plurality of sensors can include, for example, global positioning system ("GPS") sensors to generate GPS data capturing GPS coordinates, vision components to generate vision data, microphones to generate audio data based on spoken input directed to the first client device $110_1$ and detected via the user input engine $111_1$, and/or other sensors to generate corresponding audio data. As yet another example, the first client device $110_1$ may operate a local mapping system client $113_1$ (e.g., which may be standalone or part of another application, such as part of a web browser) to interact with local mapping system 120. Further, another client device $110_N$ may take the form of a HMD that is configured to render two-dimensional ("2D") and/or three-dimensional ("3D") data to a wearer as part of a VR immersive computing experience. For example, the wearer of client device $110_N$ may be presented with 3D point clouds representing various aspects of objects of interests, such as fruits of crops, particular portions of an agricultural field, and so on. Although not depicted, the another client device $110_N$ may include the same or similar components as the first client device $110_N$. For example, the another client device $110_N$ may include respective instances of a user input engine to detect and process user input, a plurality of sensors to generate corresponding sensor data, and/or a local mapping system client to interact with local mapping system 120.

In various implementations, local mapping system 120 may include user interface engine 121, vision data analysis engine 122, driving data analysis engine 123, GPS data analysis engine 124, semantic identifier engine 125, local mapping engine 126, agricultural operation engine 127, and validation engine 128 as shown in FIG. 1. In some implementations one or more of engines 121, 122, 123, 124, 125, 126, 127, and/or 128 may be omitted. In some implementations all or aspects of one or more of engines 121, 122, 123, 124, 125, 126, 127, and/or 128 may be combined. In some implementations, one or more of engines 121, 122, 123, 124, 125, 126, 127, and/or 128 may be implemented in a component that is separate from local mapping system 120. In some implementations, one or more of engines 121, 122, 123, 124, 125, 126, 127, and/or 128, or any operative portion thereof, may be implemented in a component that is executed by client device 110.

The local mapping system 120 can be utilized to generate a local mapping of an agricultural field. As used herein, a local mapping of an agricultural field refers to a mapping of an agricultural field that is defined with respect to a local or relative coordinate system defined by corresponding semantic identifiers (e.g., as described with respect to FIGS. 1, 2A, and 2B), as opposed to being defined with respect to a global coordinate system (e.g., longitude and latitude coordinates, GPS coordinates, and/or other global coordinates). Further, the local or relative coordinate system can be generated based at least in part on corresponding semantic identifiers assigned to agricultural plots included in the agricultural field and/or assigned to a plurality of rows of crops included in each agricultural plot.

Figure 2A:
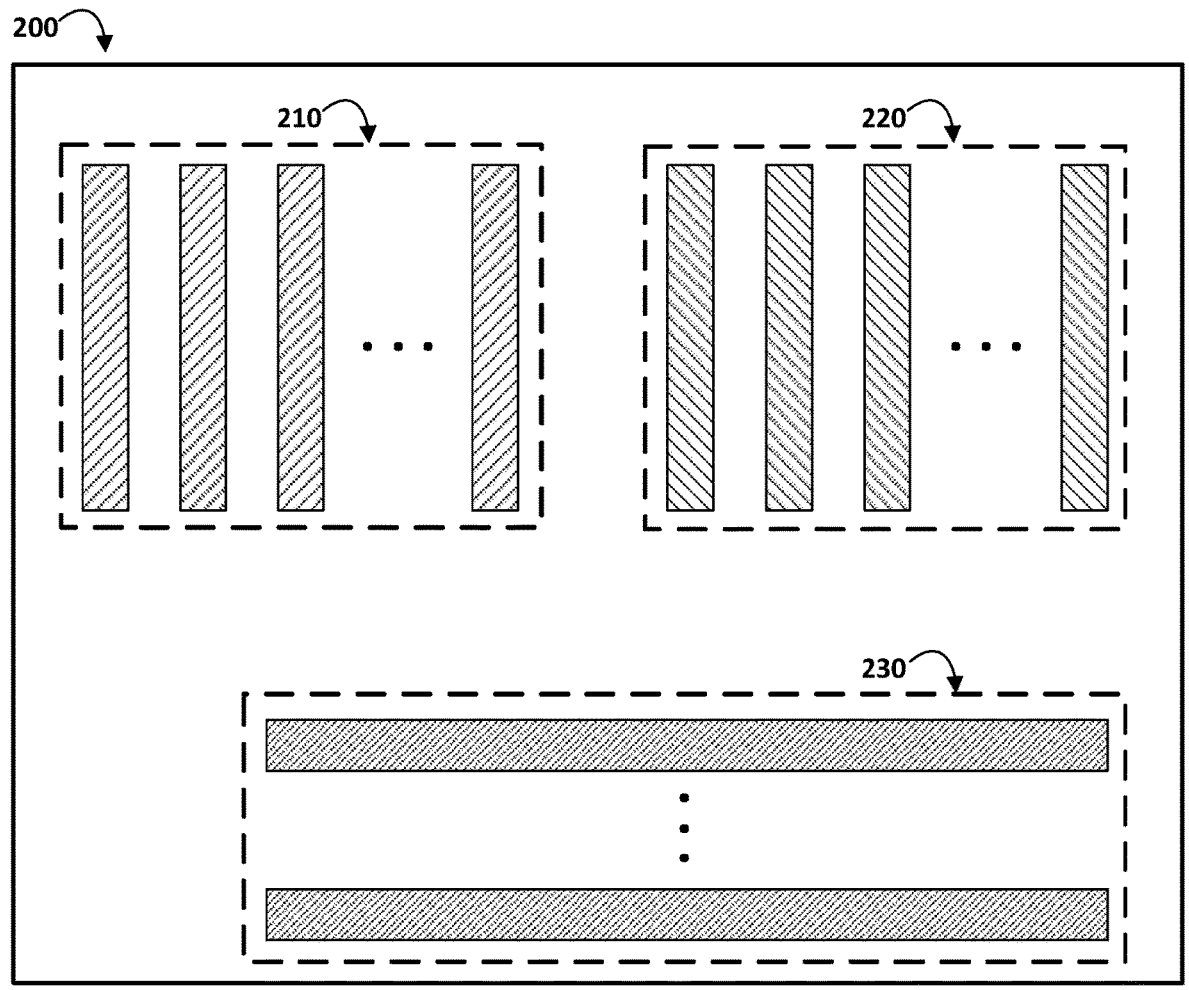
FIGS. 2A and 2B depict various non-limiting examples of an agricultural field to illustrate aspects of the present disclosure, in accordance with various implementations.
Figure 2B:
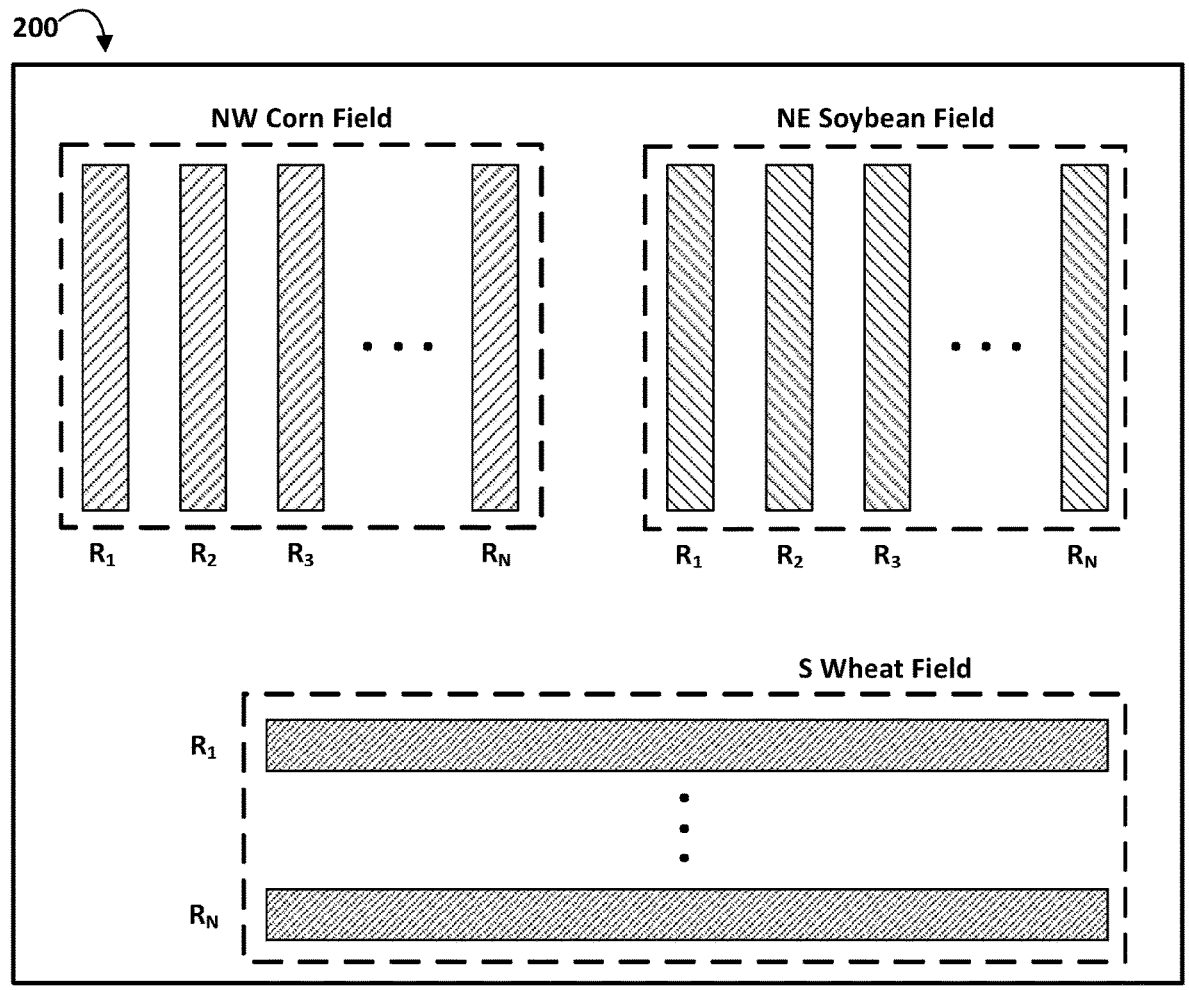

For example, and referring briefly to FIGS. 2A and 2B, an agricultural field 200 is depicted. As shown in FIG. 2A, assume the agricultural field 200 includes at least a first agricultural plot 210, a second agricultural plot 220, and a third agricultural plot 230 as indicated by the respective bounding boxes. Each of the agricultural plots 210, 220, and 230 include a plurality of rows of crops that are depicted as being contained within the respective bounding boxes as shown in FIG. 2A. Further assume the plurality of rows in the first agricultural plot 210 correspond to rows of corn stalks, the plurality of rows in the second agricultural plot 220 correspond to rows of soybean stalks, and the plurality of rows in the third agricultural plot 230 correspond to rows of wheat. As shown in FIG. 2B, the resulting local mapping of the agricultural field 200 can include the first agricultural plot 210 that is assigned a corresponding semantic identifier of NW (north-west) corn field and that has a plurality of rows assigned corresponding semantic identifiers of first row $R_1$, second row $R_2$, third row $R_3$, and so on through Nth row $R_N$, the second agricultural plot 220 that is assigned a corresponding semantic identifier of NE (north-east) soybean field and that has a plurality of rows assigned corresponding semantic identifiers of first row $R_1$, second row $R_2$, third row $R_3$, and so on through Nth row $R_N$, and the third agricultural plot 230 that is assigned a corresponding semantic identifier of S (south) wheat field and that has a plurality of rows assigned corresponding semantic identifiers of first row $R_1$ and so on through Nth row $R_N$ (e.g., as described with respect to semantic identifier engine 125).

Referring back to FIG. 1, in some implementations, the local mapping of the agricultural field can be generated based on vision data that captures at least a portion of an agricultural field. The vision data can be captured by one or more vision components, and can be stored in vision data database 122A. The one or more vision components may be associated with, for example, a satellite, a low-altitude airplane, a drone (e.g., robot $130_1$), a rover (e.g., robot $130_M$), a vision component of the first client device $110_1$, and/or associated with any other vehicle or vision component capable of capturing overhead vision data of at least the portion of the agricultural field. In some versions of those implementations, vision data analysis engine 122 can retrieve the vision data from the vision data database 122A, and can process, using vision data processing model(s), the vision data to identify one or more agricultural plots (e.g., agricultural plots 210, 220, and/or 230 of FIG. 2A), included in the portion of the agricultural field captured in the vision data, and/or to identify a plurality of rows of each of the one or more agricultural plots (e.g., as indicated by the hatched markings in FIG. 2A). The vision data analysis engine 122 can optionally process, using vision data processing model(s), the vision data to identify a respective genus and/or species of plant associated with a given agricultural plot and/or a given row of the given agricultural plot.

In some implementations, a database may be provided to store vision data processing model(s). The vision data processing model(s) may employ various techniques, such as edge detection, machine learning, segmentation, etc., to detect one or more bounding shapes that enclose an agricultural plot (e.g., the bounding boxes around agricultural plots 210, 220, and/or 230 as shown in FIG. 2A) and/or a corresponding row of the agricultural plot from among a plurality of rows of each of the one or more agricultural plots. The machine learning techniques can utilize machine learning models including, for example, a convolutional neural network ("CNN"), a sequence-to-sequence network such as encoder-decoder network, and/or any other machine learning model capable of processing the vision data to identify the agricultural plot(s) and/or the corresponding rows. In some versions of those implementations, machine learning model(s) may be utilized to identify a respective genus and/or species of plant. For example, a different machine learning model may be trained to identify respective genus and/or species of plant. For instance, one CNN may be trained to identify corn stalks, another may be trained to identify soybean stalks, another may be trained to identify strawberry plants, another may be trained to identify tomato plants, etc. As another example, a single machine learning model may be trained to identify plants across multiple species or genera. Further, the machine learning model(s) may additionally or alternatively be capable of processing the vision data to identify an occurrence of an event. The event can include, for example, a pest or weed infestation, crop destruction, crop wilting, crop flooding, and/or other events for which proactive measures can be taken by persons overseeing the crops. For example, a different machine learning model may be trained to identify occurrences of respective events. For instance, one CNN may be trained to identify pest infestations, another may be trained to identify weed infestations, another may be trained to identify crop destruction, another may be trained to identify crop wilting, etc. As another example, a single machine learning model may be trained to identify multiple events. The vision data may be applied as input across these machine learning model(s) to generate output, and the occurrence of the event may be identified based on the output generated across the machine learning model(s).

In some additional or alternative implementations, the local mapping of the agricultural field can be generated based on driving data generated during an episode of locomotion of a vehicle traversing through an agricultural field. The driving data can be stored in driving data database 123A during the episode of locomotion of the vehicle. Driving data analysis engine 123 can retrieve the driving data from the driving data database 123A, and can process the driving data to identify one or more trajectories of the vehicle based on sensor data generated by one or more sensors of the vehicle during the episode of locomotion. The one or more sensors of the vehicle can include, for example, vision components, light sensors, pressure sensors, pressure wave sensors (e.g., microphones), proximity sensors, accelerometers, gyroscopes, thermometers, barometers, GPS sensors, inertial measurement units ("IMU"), wheel encoders, and so forth. The one or more trajectories may be identified based on sensor data generated based on at least one or more of accelerometer data generated by the accelerometers and/or gyroscope data generated by one or more of the gyroscopes, GPS data generated by one or more of the GPS sensors, and/or other sensor data generated by one or more of the other sensors.

In some versions of those implementations, the vehicle may be operated according to a robotic control policy that enables the vehicle to autonomously or semi-autonomously traverse through the rows of the agricultural fields. For example, assume user input is detected at one of the client devices 110 that causes robot $130_M$ to traverse through the plurality of rows of an agricultural field to generate the local mapping. In this example, robot $130_M$ can begin traversing the plurality of rows of the agricultural field (and the different agricultural plots of the agricultural field) in response to receiving the user input. In some further versions of those implementations, driving data analysis engine 123 can automatically identify one or more trajectories corresponding to one or more rows of the agricultural field based on identifying a change from a given trajectory of the vehicle to an additional trajectory of the vehicle. For example, assume robot $130_M$ identifies a first row of an agricultural plot (e.g., using one or more vision data processing techniques) and begins traversing north and parallel with the first row along a first trajectory. Further assume the robot $130_M$ determines the first row has ended, turns east to identify a second row of an agricultural plot and follows a second trajectory, and begins traversing south and parallel with the second row along a third trajectory. In this example, driving data analysis engine 123 can determine the first trajectory corresponds to the first row and the third trajectory corresponds to the second row based on the identified changes in trajectory during the episode of locomotion. In various implementations, the one or more trajectories utilized by driving data analysis engine 123 may be restricted to those of a threshold length. As a result, driving data analysis engine 123 may not determine the second trajectory corresponds to a given row since robot $130_M$ is transitioning from the first row to the second row, and not following along a trajectory that corresponds to a row.

In some additional or alternative versions of those implementations, the vehicle may be operated by a human operator (e.g., a user of the first client device $110_1$ or another user). In some versions of those implementations, user input from the human operator can be received at a user interface of the vehicle and/or at one of the client devices 110 when the vehicle begins traversing along a row to indicate a trajectory the vehicle will travel is associated with a given row (e.g., via user interface engine 121). Further user input from the human operator can be received at the user interface of the vehicle and/or at one of the client devices 110 when the vehicle finishes traversing along the row to indicate the trajectory that the vehicle traversed is associated with the given row (e.g., via user interface engine 121). As a result, driving data analysis engine 123 may utilize the trajectory of the vehicle generated during a duration of time between the user input and the further user input as corresponding to a given row. This process can be repeated for each of the plurality of rows in the agricultural field.

GPS data analysis engine 124 can obtain GPS data generated by GPS sensors. The GPS data can capture GPS coordinates corresponding to at least the portion of the agricultural field for which the local mapping is being generated. In implementations where the local mapping is generated based on the vision data, the GPS data may be associated with the vision data (e.g., as metadata). For example, GPS coordinates corresponding to each of the agricultural plot(s) and/or the corresponding rows can be identified based on the metadata associated with the vision data. In these and other manners, GPS data for each of the agricultural plot(s) and/or the corresponding rows captured in vision data can be identified. In implementations where the local mapping is additionally or alternatively generated based on the driving data, the GPS data may be associated with the vehicle. For example, GPS coordinates corresponding to the identified trajectory of the vehicle along a given row can be identified based on the GPS data being generated by the GPS sensor(s) of the vehicle during the episode of locomotion. In these and other manners, GPS data for each of the agricultural plot(s) and/or the corresponding rows traversed during the episode of locomotion can be identified.

Semantic identifier engine 125 can cause a corresponding semantic identifier to be assigned to the identified agricultural plot(s) and/or the corresponding rows. In some implementations, semantic identifier engine 125 can cause a corresponding semantic identifier to be assigned to the identified agricultural plot(s) and/or the corresponding rows based on one or more naming schema stored in naming schema(s) database 125A. The one or more naming schema can be based on strings or sequences of alphanumeric characters, cardinal directions, names of crops, landmarks associated with the agricultural field, property boundaries associated with the agricultural field, and/or other schemas for naming the agricultural plot(s) and/or the corresponding rows. For example, as described above with respect to FIGS. 2A and 2B, the agricultural field 200 may include agricultural plots having corresponding semantic identifiers of NW corn field, NE soybean field, and S wheat field, where each of the agricultural plots having a plurality of rows assigned corresponding semantic identifiers of first row $R_1$, second row $R_2$, and so on through the Nth row $R_N$ of the corresponding agricultural plot. In this example, the naming schema utilized for assigning the corresponding semantic identifier to the agricultural plots can be based on cardinal directions and a name of a crop associated with the corresponding agricultural plot, and the naming schema utilized for assigning the corresponding semantic identifier to the rows can be based on ascending numerical order for the plurality of rows of the corresponding agricultural plots. In some additional or alternative versions of those implementations, the semantic identifiers for the rows and/or the agricultural plots can be assigned based on user input received at one of the client devices 110 and communicated to local mapping system 120 (e.g., via user interface engine 121). For example, a user can interact with the local mapping system client $113_1$ at the first client device $110_1$ to assign the corresponding semantic identifiers to one or more of the agricultural plots and/or one or more of the rows.

Local mapping engine 126 can generate a local mapping of the agricultural field based on the agricultural plot(s) and/or the corresponding rows identified using vision data analysis engine 122 and/or driving data analysis engine 123, the GPS data obtained using GPS data analysis engine 124 that corresponds to the identified the agricultural plot(s) and/or the corresponding rows, and/or the corresponding semantic identifiers assigned to the identified the agricultural plot(s) and/or the corresponding rows using semantic identifier engine 125. The local mapping can be stored in local mapping(s) database 126A, and can include a stored association between the identified agricultural plot(s) and/or the corresponding rows, GPS data corresponding to each of the identified agricultural plot(s) and/or the corresponding rows, and corresponding semantic identifiers for each of the identified agricultural plot(s) and/or the corresponding rows. This enables the individual rows in the respective agricultural plots to be easily referenced by a user and/or system (e.g., NW corn field, row 53; or soybean field, row 29), as opposed to GPS coordinates or other position coordinates that reference the same row (e.g., longitudinal and latitudinal coordinates).

In various implementations, agricultural operations engine 127 can subsequently utilize the local mapping of the agricultural field in performance of one or more agricultural operations. The one or more agricultural operations can include, for example, notifying a user associated with the agricultural field of an occurrence of an event in the agricultural field, causing an action to be performed responsive to the occurrence of the event, processing one or more search queries related to the agricultural field, and/or other agricultural operations that may benefit from utilization of a local mapping of the agricultural field. The event can include, for example, a pest or weed infestation, crop destruction, crop wilting, crop flooding, and/or other events for which proactive measures can be taken by persons overseeing the crops.

For example, assume additional vision data that captures at least the portion of the agricultural field included in the local mapping is generated by one or more vision components. The additional vision data can be, for example, overhead vision data captured by robot $130_1$ flying over the agricultural field, field-level vision data captured by robot $130_M$ while traversing through the agricultural field, and/or other vision data. The additional vision data can be analyzed to identify an occurrence of an event associated with at least one row of the plurality of rows. Further, a notification can be generated based on the local mapping and based on the identified event, and rendered at one or more of the client devices 110 of the user. For example, a notification of "Rows 97-103 of the NW corn field are wilting" can be generated and rendered at the client device of the user in response to determining corn stalks in these rows are wilting based on processing the additional vision data and based on the local mapping (e.g., stored in the local mapping(s) database 126A). More particularly, additional GPS data associated as metadata with the additional vision data can be utilized to identify corresponding semantic identifiers associated with the agricultural plot(s) and/or the corresponding rows that are identified as wilting, and the notification can be generated based on those semantic identifiers. The notification can optionally include one or more selectable elements that, when selected, cause the action to be performed. Continuing with the above example, the actions may include causing robot $130_M$ to traverse through the agricultural field to the identified rows to water the wilting corn stalks, causing an irrigation system to automatically water the wilting corn stalks, and/or other actions to address the wilting corn stalks.

As another example, in response to receiving the notification of "rows 97-103 of the NW corn field are wilting", assume the user goes to the NW corn field. However, the user may not specifically know which rows of the west corn field are rows 97-103. Accordingly, the user may submit a query to the system of "where are rows 97-103 of the west corn field" via user interface engine 121. In this example, the agricultural operations engine 127 can cause output to be presented to the user at one of the client devices 110 that indicates where rows 97-103 of the west corn field are in relation to the user (e.g., "keep walking forward for six more rows and turn left", "turn around and walk back two rows then turn left", etc.). Utilizing a local mapping in performance of one or more agricultural operations is described below (e.g., with respect to FIGS. 6A and 6B).

In various implementations, validation engine 128 can subsequently validate the local mapping of the agricultural field. In some implementations, validation engine 128 can validate the local mapping based on generating an additional local mapping for at least the portion of the agricultural field, and comparing the additional local mapping to the local mapping for the agricultural field stored in local mapping(s) database 126A. For example, the additional local mapping can be generated based on processing additional vision data using vision data analysis engine 122 and/or additional driving data using driving data analysis engine 123, and additional GPS data obtained and processed using GPS data analysis engine 124. Validation engine 128 can generate a loss based on a difference between the local mapping and the additional local mapping if the difference satisfies a different threshold. The difference can be based on, for example, a corresponding distance value between a given row in the local mapping and the given row in the additional mapping, a landmark in the local mapping and the landmark in the additional mapping, and/or other techniques for comparing the local mapping and the additional local mapping. In some versions of those implementations, the local mapping may be automatically updated based on the loss or an indication that the local mapping is valid can be stored in association with the local mapping, whereas in other versions of those implementations, the user may be notified of the difference between the local mapping and the additional local mapping and optionally prompted to take one or more actions to correct the local mapping.

In additional or alternative implementations, validation engine 128 can validate the local mapping based on additional GPS data generated by GPS sensor(s). For example, assume a vehicle is traversing through an agricultural field during an episode of locomotion (e.g., where the vehicle is operated according to a robotic control policy or manually by a human operator). Further assume the vehicle includes one or more GPS sensors to generate GPS data corresponding to GPS coordinates for a current location of the vehicle within the agricultural field (e.g., located at or near a given crop of a given row of crops of a given agricultural plot of the agricultural field) that are obtained via GPS data analysis engine 124. Based on the GPS data, validation engine 128 can access the local mapping of the agricultural field (e.g., from local mapping(s) database 126A) to identify the current location of the vehicle with respect to the local mapping, and generate a request for a user of one or more of the client devices 110 to validate the current location of the vehicle. In this example further assume a vehicle operating according to a robotic control policy is traversing along row 104 $R_{104}$ of NW corn field from FIG. 2B. Validation engine 128 can cause a request of "please verify that my current location is by row 104 of NW corn field" to be visually and/or audibly rendered at one or more of the client devices 110. Based on user input received responsive to the request, the local mapping can be validated or invalidated. Validating the local mapping based on requests rendered at one or more of the client devices is described in detail herein (e.g., with respect to FIG. 6C).

By using techniques described herein, one or more technological advantages may be achieved. As one non-limiting example, by subsequently utilizing the local mapping and the corresponding semantic identifiers thereof in performance of one or more agricultural operations, a user can easily identify locations where events have occurred in the agricultural field As a result, a quantity of user inputs received at one or more of the client devices 110 may be reduced since a user need not repeatedly query a system to identify a location where the event occurred, thereby conversing computational and/or network resources. For instance, by notifying a user that "corn stalks are wilting in rows 97-103 of NW corn field", the user knows the agricultural plot and the specific rows of the agricultural plot associated with the wilting corn stalks. In contrast, if the user was notified that "corn stalks are wilting at longitude and latitude coordinates<37.2431° N, 115.7930° W>", the user may then need to utilize one or more of the client devices 110 to query these coordinates one or more times to identify the location of these longitude and latitude coordinates within the agricultural field. As another non-limiting example, by subsequently utilizing the local mapping and the corresponding semantic identifiers thereof in performance of one or more agricultural operations, one or more of the agricultural operations may be performed in a more quick and efficient manner than if the local mapping was not available. For instance, by notifying a user that "corn stalks are wilting in rows 97-103 of NW corn field", the user knows the event that occurred and the location of where the event occurred. As a result, the user may cause one or more actions to be performed to address the identified event, which may result in a greater crop yield or higher quality crop yield.

Figure 3:
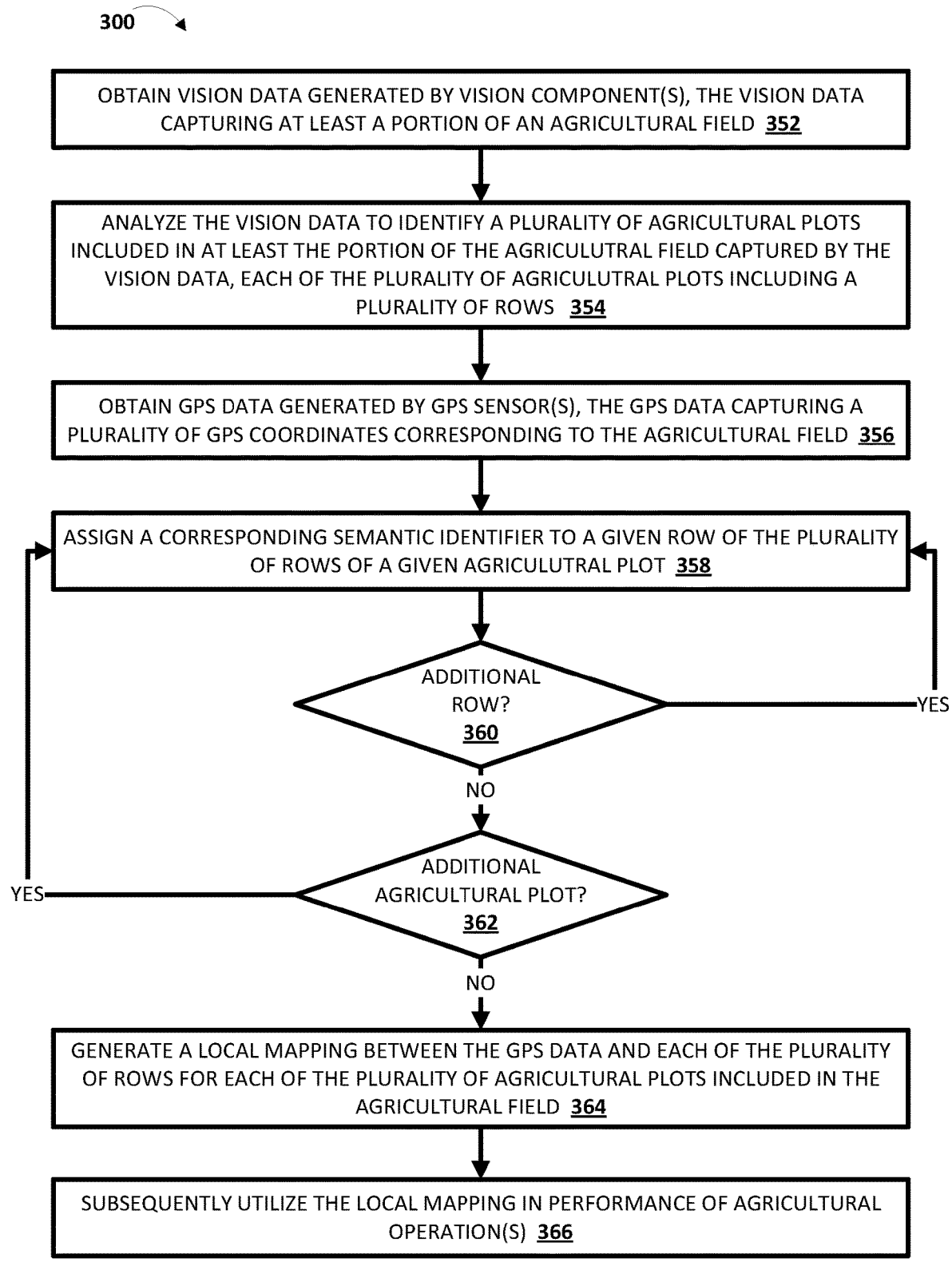
FIG. 3 depicts a flowchart illustrating an example method of assigning semantic identifiers to row(s) of an agricultural field based on overhead vision data in generating a local mapping of the agricultural field, in accordance with various implementations.

Turning now to FIG. 3, a flowchart illustrating an example method 300 of assigning semantic identifiers to row(s) of an agricultural field based on overhead vision data in generating a local mapping of the agricultural field is depicted. For convenience, the operations of the method 300 are described with reference to a system that performs the operations. This system of the method 300 includes at least one processor, at least one memory, and/or other component(s) of computing device(s) (e.g., client device(s) $110_{1-N}$ of FIG. 1, robot(s) $130_{1-M}$ of FIG. 1, local mapping system 120 of FIG. 1, robot 730 of FIG. 7, computing device 810 of FIG. 8, server(s), and/or other computing devices). Moreover, while operations of the method 300 are shown in a particular order, this is not meant to be limiting. One or more operations may be reordered, omitted, and/or added.

At block 352, the system obtains vision data generated by one or more vision components, the vision data capturing at least a portion of an agricultural field. The vision data can include image data, video data, and/or any other type of vision data. The one or more vision components may be associated with, for example, a satellite, a low-altitude airplane, a drone (e.g., robot $130_1$ of FIG. 1), a rover (e.g., robot $130_M$ of FIG. 1), a vision component of the first client device $110_1$, and/or associated with any other vehicle or vision component capable of capturing overhead vision data of at least the portion of the agricultural field. The vision data may be obtained directly from one or more vision components, or obtained indirectly from one or more of the vision components via a database (e.g., vision data database 122A of FIG. 1).

At block 354, the system analyzes the vision data to identify a plurality of agricultural plots included in at least the portion of the agricultural field captured by the vision data, each of the plurality of agricultural plots including a plurality of rows. For example, the system can analyze the vision data using one or more vision processing models to identify the plurality of agricultural plots, the plurality of rows of each of the agricultural plots, a respective genus and/or species of plant associated with a given agricultural plot and/or a given row of the given agricultural plot. The vision data processing model(s) may employ various techniques, such as edge detection, machine learning, segmentation, etc. as described above (e.g., with respect to vision data analysis engine 122).

At block 356, the system obtains GPS data generated by one or more GPS sensors, the GPS capturing a plurality of GPS coordinates corresponding to the agricultural field. In some implementations, the GPS data can be included in metadata that is associated with the vision data captured by the vision component(s). For example, the GPS coordinates can be embedded in the vision data that captures the portion of the agricultural field. In some additional or alternative implementations, the GPS data can be previously generated by the GPS sensor(s) and mapped to the vision data. For example, the GPS data can be generated by a GPS sensor of a vehicle (e.g., human operated or operated according to a robotic control policy) and/or a satellite, and can be stored in association with the agricultural field.

At block 358, the system assigns a corresponding semantic identifier to a given row of the plurality of rows of a given agricultural plot. The system can optionally further assign a corresponding semantic identifier to the given agricultural plot that includes the given row. In some implementations, the system can automatically assign the corresponding semantic identifier to the given row and/or the given agricultural plot based on one or more naming schema (e.g., as described with respect to semantic identifier engine 125 of FIG. 1). In additional or alternative implementations, the system can assign the corresponding semantic identifier to the given row and/or the given agricultural plot based on user input from a user of a client device (e.g., as described with respect to semantic identifier engine 125 of FIG. 1). The user may be a human that is associated with the agricultural field.

At block 360, the system determines whether there is an additional row, of the plurality of rows of the given agricultural plot, that has not been assigned a corresponding semantic identifier. The system can determine whether there is an additional row that has not been assigned a corresponding semantic identifier based on determining that one or more of the plurality of rows of the given agricultural plot identified at block 354 have not been assigned a corresponding semantic identifier. If, at an iteration of block 360, the system determines there is an additional row, of the plurality of rows of the given agricultural plot, that has not been assigned a corresponding semantic identifier, then the system may return to block 358 and assign a corresponding semantic identifier to the additional row of the plurality of rows of the given agricultural plot. The operations of block 358 and 360 may be repeated until each of the plurality of rows of the given agricultural plot are assigned corresponding semantic identifiers. If, at an iteration of block 360, the system determines that each of the plurality of rows, of the given agricultural plot, have been assigned a corresponding semantic identifier, then the system may proceed to block 362.

At block 362, the system determines whether there is an additional agricultural plot included in at least the portion of the agricultural field captured by the vision data for which the plurality of rows have not been assigned semantic identifiers. The system can determine whether there is an additional agricultural plot that has not been assigned a corresponding semantic identifier based on determining that one or more of the plurality of agricultural plots identified at block 354 have not been assigned a corresponding semantic identifier. If, at an iteration of block 362, the system determines there is an additional agricultural plot, of the plurality of agricultural plots, that has a plurality of rows that have not been assigned a corresponding semantic identifier, then the system may return to block 358. The operations of block 358 and 360 may be repeated until each of the plurality of rows of the additional agricultural plot are assigned corresponding semantic identifiers. Further, the operations of block 362 may be repeated until each of the plurality of rows, of each of the plurality of agricultural plots captured by the vision data, are assigned corresponding semantic identifiers. If, at an iteration of block 362, the system determines each of the plurality of agricultural plots, of the plurality of agricultural plots captured by the vision data, have been assigned a corresponding semantic identifier, then the system may proceed to block 364.

At block 364, the system generates a local mapping between the GPS data and each of the plurality of rows for each of the plurality of agricultural plots included in the agricultural field. Further, the local mapping can include the corresponding semantic identifiers assigned to the agricultural plots and/or the corresponding rows of the agricultural plots. The local mapping can be stored in one or more databases (e.g., local mapping(s) database 126A of FIG. 1), and can include a stored association between the identified agricultural plot(s) and/or the corresponding rows, GPS data corresponding to each of the identified agricultural plot(s) and/or the corresponding rows, and the corresponding semantic identifiers for each of the identified agricultural plot(s) and/or the corresponding rows. This enables the individual rows in the respective agricultural plots to be easily referenced by a user and/or system (e.g., NW corn field, row 53; or soybean field, row 29), as opposed to GPS coordinates or other position coordinates that reference the same row (e.g., longitudinal and latitudinal coordinates).

At block 366, the system subsequently utilizes the local mapping in performance of one or more agricultural operations. The one or more agricultural operations can include, for example, notifying a user associated with the agricultural field of an occurrence of an event in the agricultural field, causing an action to be performed responsive to the occurrence of the event, processing one or more search queries related to the agricultural field, and/or other agricultural operations that may benefit from utilization of a local mapping of the agricultural field. Subsequently utilizing the local mapping in performance of one or more agricultural operations is described herein (e.g., with respect to agricultural operations engine 127 of FIG. 1, and FIGS. 6A and 6B).

Figure 4:
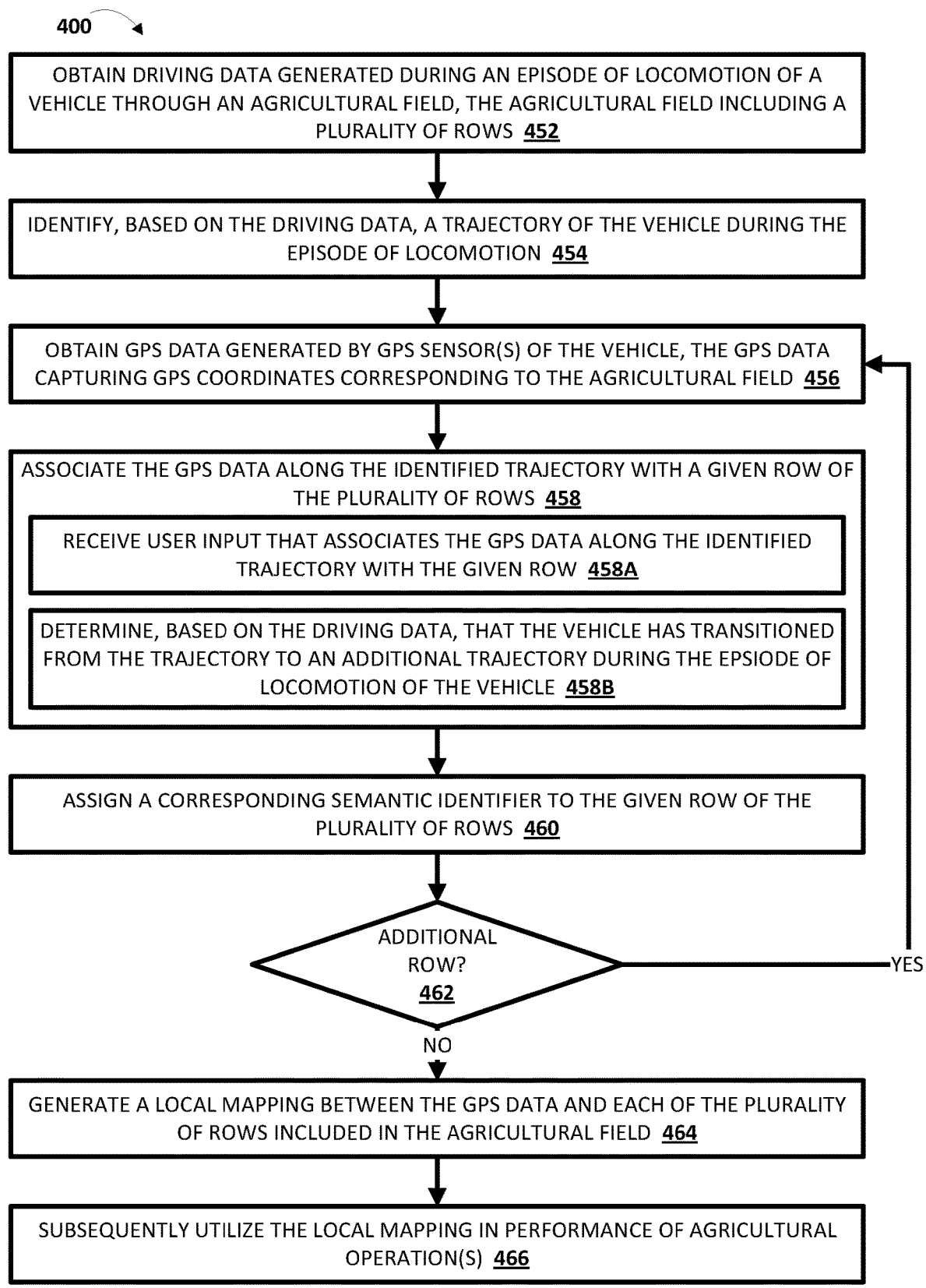
FIG. 4 depicts a flowchart illustrating an example method of assigning semantic identifiers to row(s) of an agricultural field based on overhead driving data in generating a local mapping of the agricultural field, in accordance with various implementations.

Turning now to FIG. 4, a flowchart illustrating an example method 400 of assigning semantic identifiers to row(s) of an agricultural field based on overhead driving data in generating a local mapping of the agricultural field is depicted. For convenience, the operations of the method 400 are described with reference to a system that performs the operations. This system of the method 400 includes at least one processor, at least one memory, and/or other component(s) of computing device(s) (e.g., client device(s) $110_{1-N}$ of FIG. 1, robot(s) $130_{1-M}$ of FIG. 1, local mapping system 120 of FIG. 1, robot 730 of FIG. 7, computing device 810 of FIG. 8, server(s), and/or other computing devices). Moreover, while operations of the method 400 are shown in a particular order, this is not meant to be limiting. One or more operations may be reordered, omitted, and/or added.

At block 452, the system obtains driving data generated during an episode of locomotion of a vehicle through an agricultural field, the agricultural field including a plurality of rows. In some implementations, the vehicle may be operated autonomously or semi-autonomously according to a robotic control policy, whereas in other implementations the vehicle may be operated manually by a human operator.

At block 454, the system identifies, based on driving data, a trajectory of the vehicle during the episode of locomotion. In some implementations, the system can automatically identify the trajectory of the vehicle. For example, the system can process the driving data to identify one or more trajectories of the vehicle based on sensor data generated by one or more sensors of the vehicle during the episode of locomotion. The one or more trajectories may be identified based on sensor data generated based on at least one or more of accelerometer data generated by the accelerometers and/or gyroscope data generated by one or more of the gyroscopes, IMU data generated by one or more of the IMUs, wheel encoder data generated by one or more of the wheel encoders, GPS data generated by one or more of the GPS sensors, and/or other sensor data generated by one or more of the other sensors of the vehicle. In some additional or alternative implementations, the system can identify the trajectory of the vehicle based on user input from a user that is received at a client device of the user (e.g., an in-vehicle system or another client device of the user). The user input can include spoken input, typed input, and/or touch input, and can indicate when the vehicle begins following a given trajectory and when the vehicle has completed the trajectory.

At block 456, the system obtains GPS data generated by one or more GPS sensors of the vehicle, the GPS data capturing GPS Coordinates corresponding to the agricultural field along the identified trajectory. In some implementations, the GPS data can be directly obtained from one or more of the GPS sensors of the vehicle as the vehicle traverses along the identified trajectory. In some additional or alternative implementations, the GPS data be retrieved from one or more databases (e.g., driving data database 123A of FIG. 1) subsequent to the episode of locomotion of the vehicle.

At block 458, the system associates the GPS data along the identified trajectory with a given row of the plurality of rows. In some implementations, block 458 may include sub-block 458A. If included, at sub-block 458A, the system receives user input that associates the GPS data along the identified trajectory with the given row. The user input can be received via a user interface of a client device of a user. Further, the user input can include spoken input, typed input, and/or touch input. In implementations when user input is received to identify a given trajectory of the vehicle, the system can associate GPS data received subsequent to receiving the user input to start tracking the given trajectory and prior to receiving the user input to finish tracking the given trajectory as corresponding to the given row.

In some additional or alternative implementations, block 458 may include sub-block 458B. If included, at sub-block 458B, the system determines, based on the driving data, that the vehicle has transitioned from the trajectory to an additional trajectory during the episode of locomotion of the vehicle. In implementations when a given trajectory of the vehicle is automatically identified based on the driving data, the system can associate GPS data corresponding to the identified trajectory as corresponding to the given row. In some versions of those implementations, the trajectories considered as corresponding to the given row may be restricted to those that satisfy a distance threshold. For example, a trajectory that is three meters may not be indicative of the given row, whereas a trajectory of 100 meters may be indicative of the given row. Rather, the three meter trajectory may correspond to the vehicle transitioning from the given row to an additional row, and indicate the vehicle has transitioned from the trajectory to the additional trajectory during the episode of locomotion.

At block 460, the system assigns a corresponding semantic identifier to the given row of the plurality of rows. The system can optionally further assign a corresponding semantic identifier to a given agricultural plot that includes the given row. In some implementations, the system can automatically assign the corresponding semantic identifier to the given row and/or the given agricultural plot based on one or more naming schema (e.g., as described with respect to semantic identifier engine 125 of FIG. 1). In additional or alternative implementations, the system can assign the corresponding semantic identifier to the given row and/or the given agricultural plot based on user input from a user of a client device (e.g., as described with respect to semantic identifier engine 125 of FIG. 1). The user may be a human that is associated with the agricultural field.

At block 462, the system determines whether there is an additional row, of the plurality of rows of the agricultural field, based on the driving data generated during the episode of locomotion including an additional trajectory. The system can determine that there is an additional row based on an additional trajectory being identified in the same or similar manner described above with respect to block 454. If, at an iteration of block 462, the system determines there is an additional row, of the plurality of rows of the agricultural field, based on the driving data, then the system may return to block 456. The operations of block 456, 458, and 460 may be repeated to assign a corresponding semantic identifier to the additional row. Further, the operations of block 462 may be repeated to assign a corresponding semantic identifier to any other additional rows that are identified based on the driving data. If, at an iteration of block 462, the system determines that each of the plurality of rows, of the given agricultural plot, have been assigned a corresponding semantic identifier, then the system may proceed to block 464.

At block 464, the system generates a local mapping between the GPS data and each of the plurality of rows included in the agricultural field. Further, the local mapping can include the corresponding semantic identifiers assigned to the agricultural plots and/or the corresponding rows of the agricultural plots. The local mapping can be stored in one or more databases (e.g., local mapping(s) database 126A of FIG. 1), and can include a stored association between the identified agricultural plot(s) and/or the corresponding rows, GPS data corresponding to each of the identified agricultural plot(s) and/or the corresponding rows, and the corresponding semantic identifiers for each of the identified agricultural plot(s) and/or the corresponding rows. This enables the individual rows in the respective agricultural plots to be easily referenced by a user and/or system (e.g., NW corn field, row 53; or soybean field, row 29), as opposed to GPS coordinates or other position coordinates that reference the same row (e.g., longitudinal and latitudinal coordinates).

At block 466, the system subsequently utilizes the local mapping in performance of one or more agricultural operations. The one or more agricultural operations can include, for example, notifying a user associated with the agricultural field of an occurrence of an event in the agricultural field, causing an action to be performed responsive to the occurrence of the event, processing one or more search queries related to the agricultural field, and/or other agricultural operations that may benefit from utilization of a local mapping of the agricultural field. Subsequently utilizing the local mapping in performance of one or more agricultural operations is described herein (e.g., with respect to agricultural operations engine 127 of FIG. 1, and FIGS. 6A and 6B).

Figure 5:
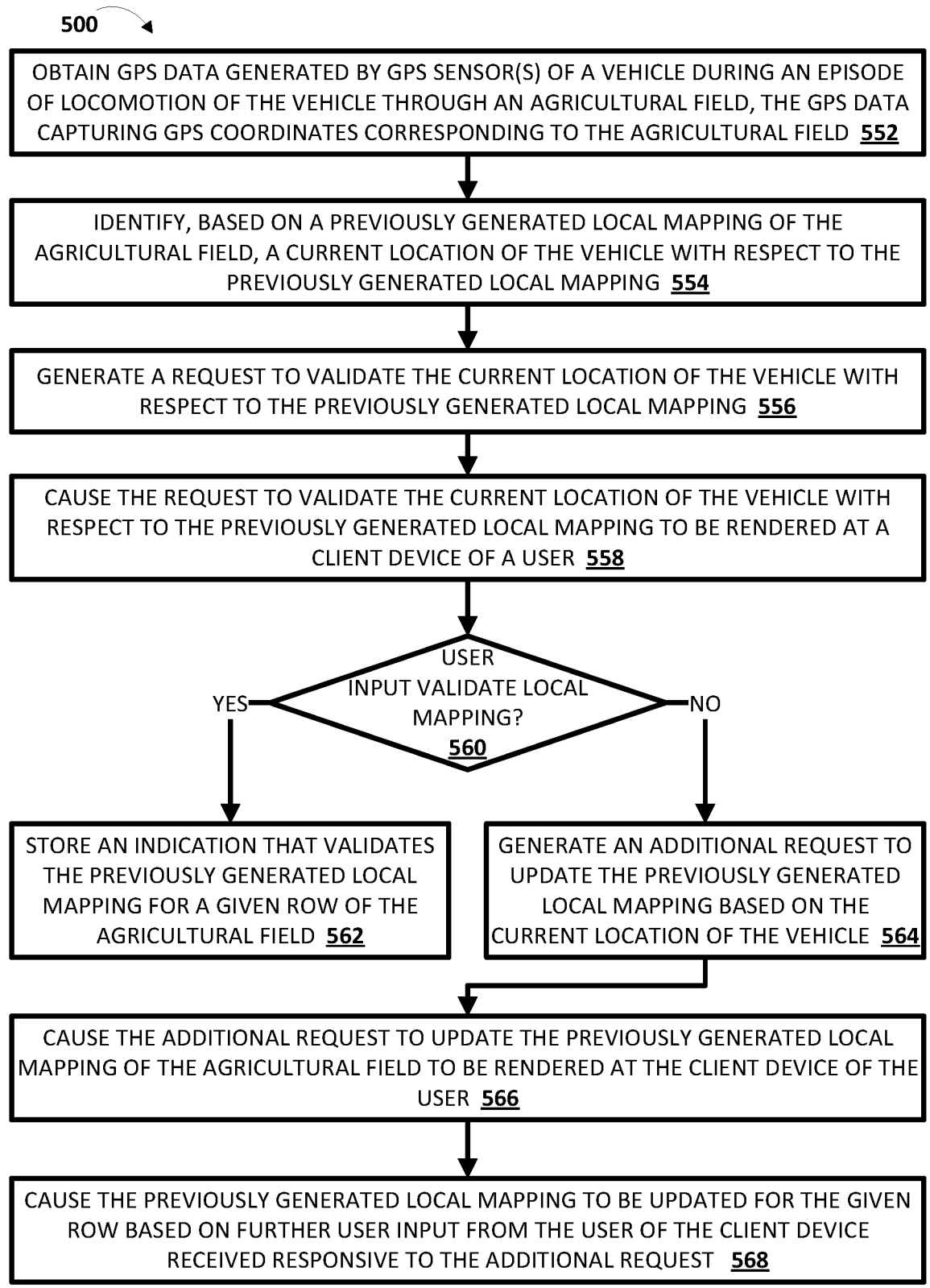
FIG. 5 depicts a flowchart illustrating an example method of validating a local mapping of an agricultural field, in accordance with various implementations.

Turning now to FIG. 5, a flowchart illustrating an example method 500 of validating a local mapping of an agricultural field is depicted. For convenience, the operations of the method 500 are described with reference to a system that performs the operations. This system of the method 500 includes at least one processor, at least one memory, and/or other component(s) of computing device(s) (e.g., client device(s) $110_{1-N}$ of FIG. 1, robot(s) $130_{1-M}$ of FIG. 1, local mapping system 120 of FIG. 1, robot 730 of FIG. 7, computing device 810 of FIG. 8, server(s), and/or other computing devices). Moreover, while operations of the method 500 are shown in a particular order, this is not meant to be limiting. One or more operations may be reordered, omitted, and/or added.

At block 552, the system obtains GPS data generated by one or more GPS sensors of a vehicle during an episode of locomotion of the vehicle through an agricultural field. In some implementations, the GPS data can be directly obtained from one or more of the GPS sensors of the vehicle as the vehicle traverses along the identified trajectory. In some additional or alternative implementations, the GPS data be retrieved from one or more databases (e.g., driving data database 123A of FIG. 1) subsequent to the episode of locomotion of the vehicle. The vehicle can be operated autonomously or semi-autonomously according to a robotic control policy, or can be operated manually by a human operator.

At block 554, the system identifies, based on a previously generated local mapping of the agricultural field, a current location of the vehicle with respect to the previously generated local mapping. For example, the system can access the previously generated local mapping (e.g., stored in local mapping(s) database 126A of FIG. 1), and can identify local mapping coordinates that correspond to the GPS data generated by one or more of the GPS sensors of the vehicle. The system can utilize the local mapping coordinates as the current location of the vehicle.

At block 556, the system generates a request to validate the current location of the vehicle with respect to the previously generated local mapping. At block 558, the system causes the request to validate the current location of the vehicle with respect to the previously generated local mapping to be rendered at a client device of a user. The request can include an indication of the current location of the vehicle in terms of the local mapping coordinates, and a request for the user to validate the local mapping coordinates as corresponding to an actual location of the vehicle. Further, the request be visually and/or audibly rendered at the client device of the user.

At block 560, the system determines whether user input from the user received at the client device validates the current location of the vehicle with respect to the previously generated local mapping. If, at an iteration of block 560, the system determines the user input validates the previously generated local mapping, the system proceeds to block 562. For example, the request can include a validation selectable element that, when selected via user input, causes the current location of the vehicle to be validated as the actual location of the vehicle. At block 562, the system stores an indication that validates the previously generated local mapping for a given row of the agricultural field. Assuming the user provides user input to validate the current location of the vehicle, the indication notifies the system that the previously generated local mapping, for at least the given row, is correct. If, at an iteration of block 560, the system determines the user input invalidates the previously generated local mapping, the system proceeds to block 564. For example, the request can additionally or alternatively include an invalidation selectable element that, when selected, causes the current location of the vehicle to be invalidated. Assuming the user provides user input to invalidate the current location of the vehicle, the system may proceed to block 564.

At block 564, the system generates an additional request to update the previously generated local mapping based on the current location of the vehicle. At block 566, the system causes the additional request to update the previously generated local mapping of the agricultural field to be rendered at the client device of the user. At block 568, the system causes the previously generated local mapping to be updated for the given row based on further user input from the user of the client device received responsive to the additional request. The additional request can solicit an alternative row and/or an alternative agricultural plot to be stored in association with the current location of the vehicle in the previously generated local mapping in response to receiving user input that invalidates the current location of the vehicle with respect to identified local coordinates from the previously generated local mapping. Further, the previously generated local mapping can be updated in response to receiving the further user input that includes the alternative row and/or the alternative agricultural plot. The alternative row and/or the alternative agricultural plot can replace the given row and/or the given agricultural plot that was previously stored in association with the GPS data.

Figure 6A:
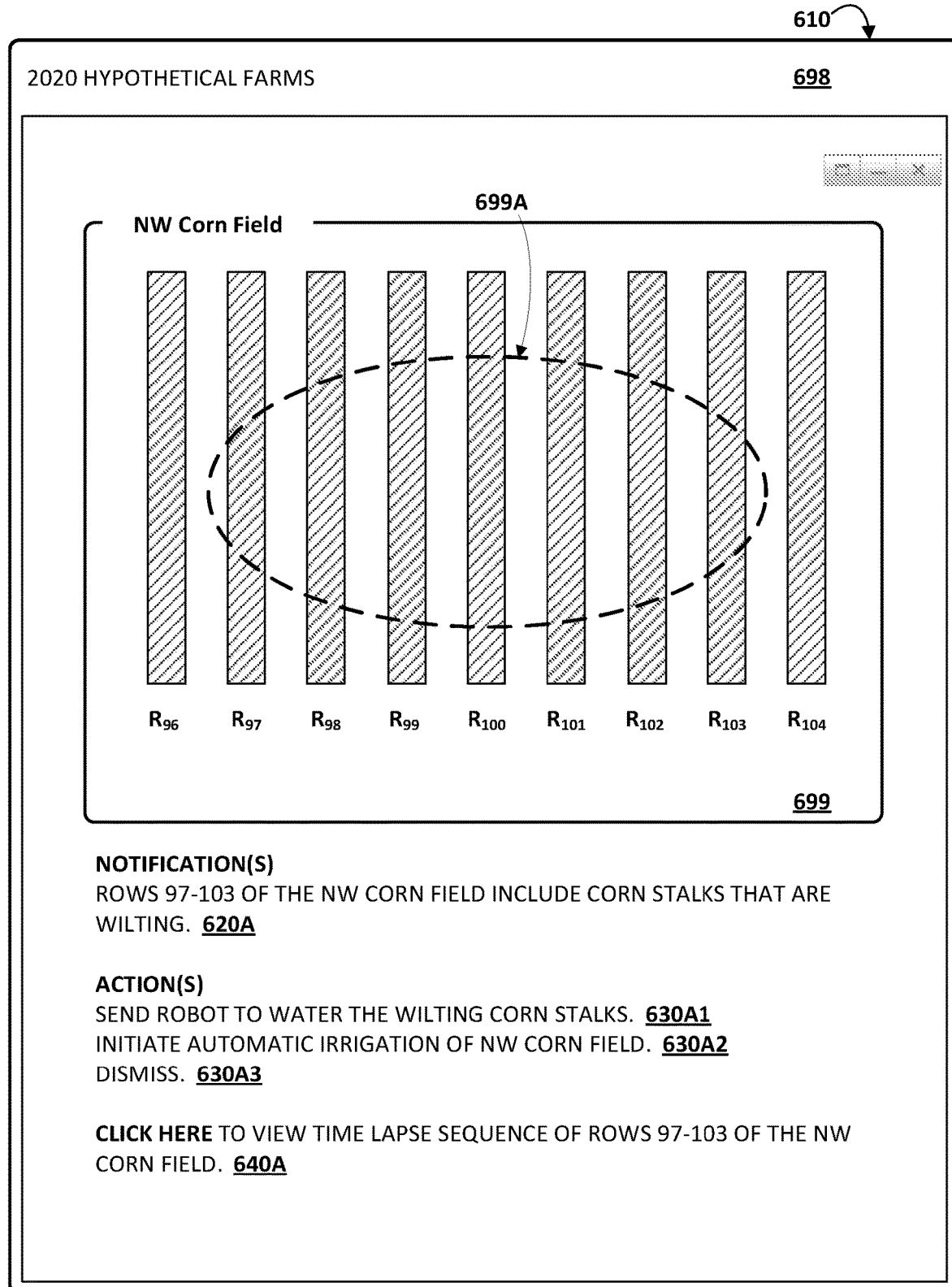
FIGS. 6A, 6B, and 6C depict various non-limiting examples of a graphical user interface associated with a local mapping system, in accordance with various implementations.
Figure 6B:
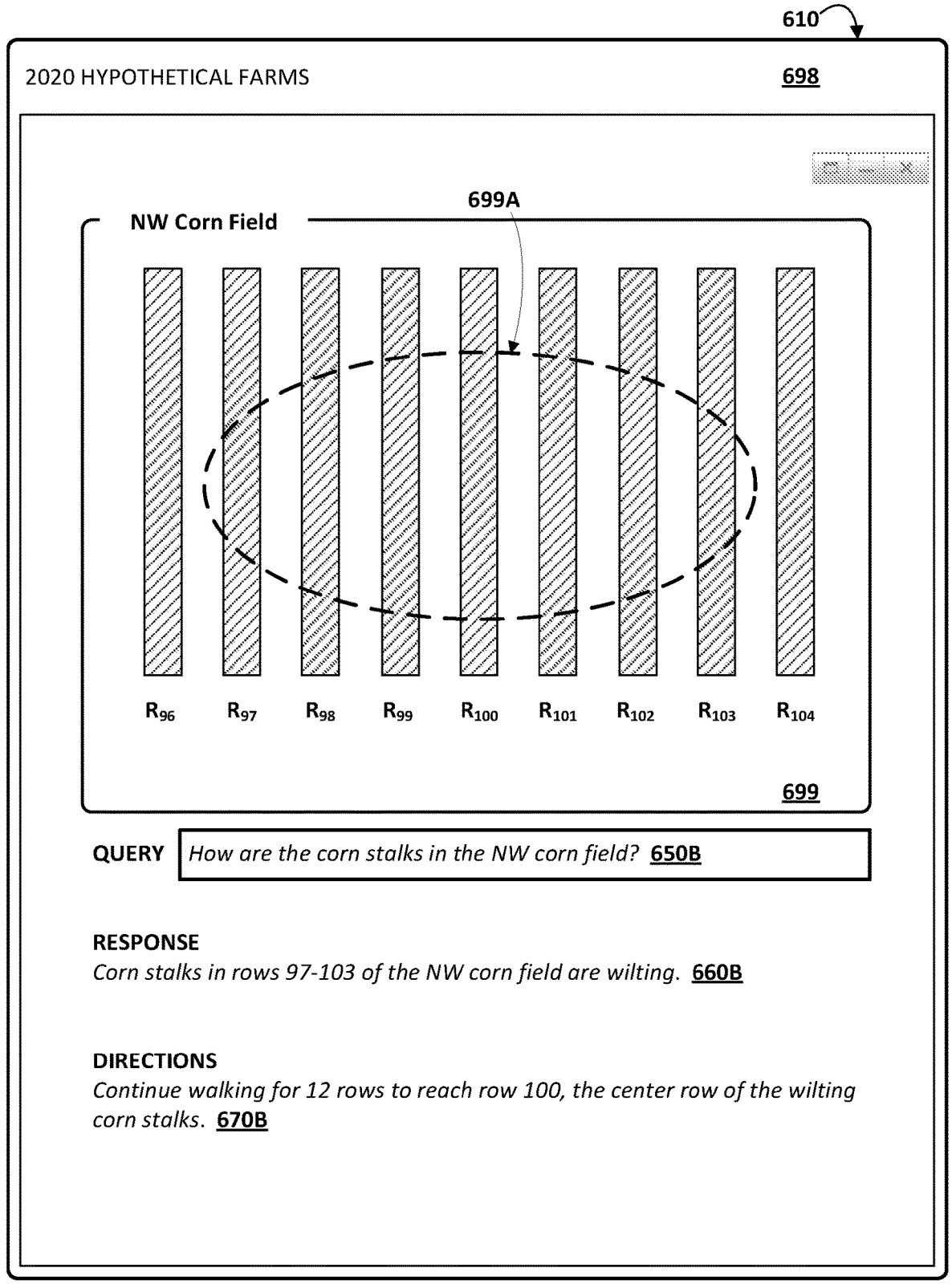
Figure 6C:
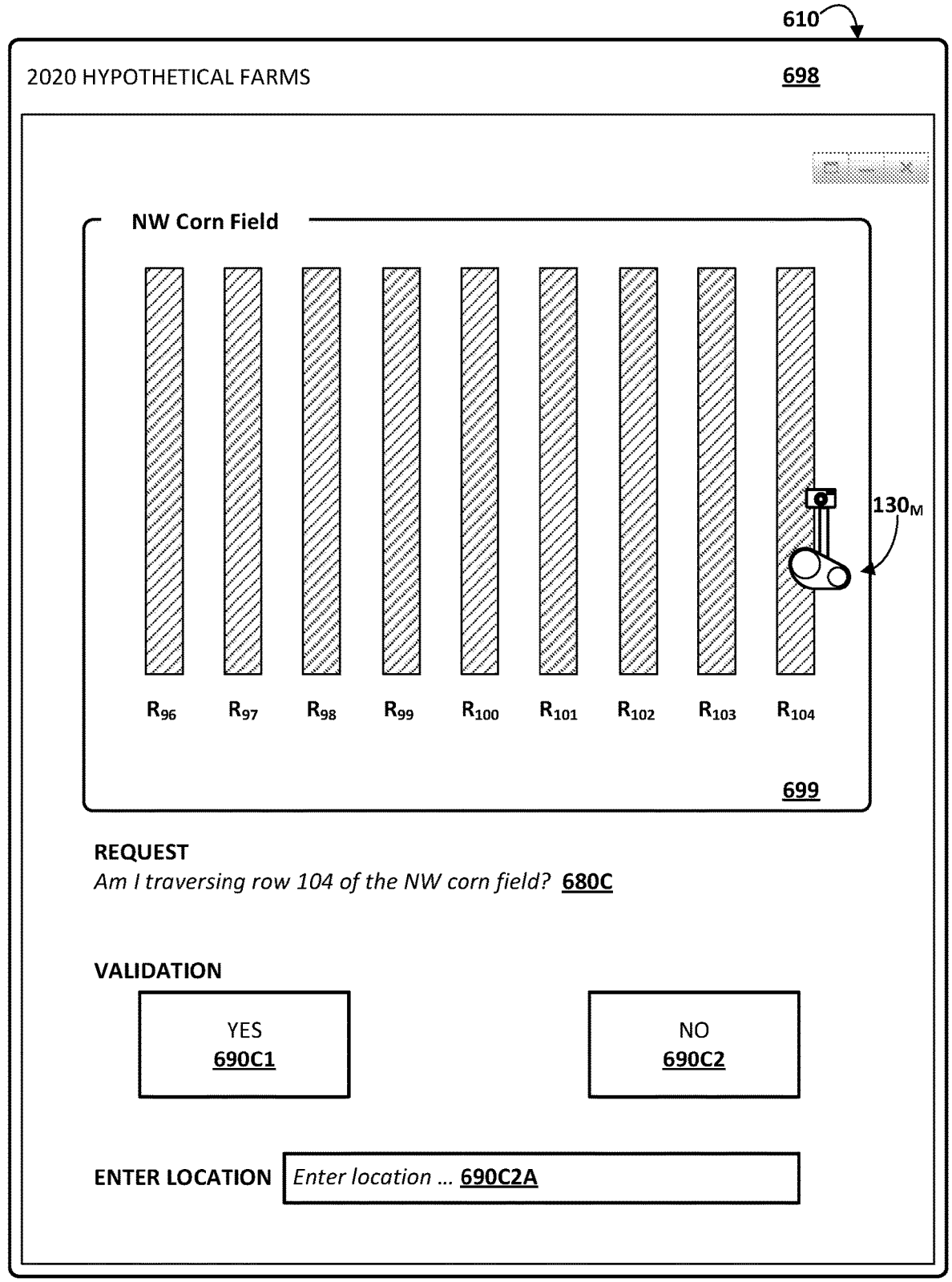

Turning now to FIGS. 6A, 6B, and 6C, various non-limiting examples of a graphical user interface (GUI) 698 associated with a local mapping system 120 of FIG. 1 (e.g., provided by user interface engine 121 of FIG. 1) are depicted at a client device 610. In some implementations, GUI 698 may be provided as a website that is accessible via a web browser of the client device 610. In other instances, GUI 698 may be provided as part of a software application that operates at the client device 610 (e.g., smart phone, tablet, etc.) using data received/obtained from local mapping system 120 of FIG. 1. In yet other instances where the client device 610 is an HMD (e.g., client device $110_N$), the client device 610 may operate a VR or AR application that receives/obtains data from local mapping system 120 of FIG. 1 and provides a user with an immersive experience. For the sake of example throughout FIGS. 6A, 6B, and 6C, assume that the local mapping depicted in FIG. 2B corresponds to a previously generated local mapping that is associated with a hypothetical agricultural field—2020 Hypothetical Farms (e.g., as indicated by GUI 698). Accordingly, the agricultural field of the previously generated local mapping includes at least a first agricultural plot of NW corn field having corresponding rows $R_1$-$R_N$, a second agricultural plot of NE soybean field having corresponding rows $R_1$-$R_N$, and a third agricultural plot of S wheat field having corresponding rows $R_1$-$R_N$.

In some implementations, GUI 698 may be operable by a user to interact with the previously generated local mapping of an agricultural field in performance of various types of agricultural operations. The agricultural operations may be associated with an identified event that is associated with the agricultural field. For example, and referring specifically to FIG. 6A, further assume that a plurality of corn stalks of NW corn field are wilting as shown by a portion 699 of GUI 698 (e.g., as indicated by the area 699A encompassed in the dashed ellipse). It may be determined that the plurality of corn stalks included in the area 699A are wilting based on processing vision data generated by one or more vision components that captures at least the area 699A of NW corn field. For example, a drone (e.g., robot $130_1$ of FIG. 1) or low-altitude airplane hovering or flying above the NW corn field can capture the vision data via respective vision components, a rover (e.g., robot $130_M$ of FIG. 1) or other vehicle traversing through the NW corn field can capture the vision data via respective vision components, etc. Further, the vision data can be processed, using vision data processing model(s), to determine that the corn stalks included in the area 699A are wilting via machine learning techniques. For instance, one or more CNNs can process the vision data to identify the crops as corn stalks, and one or more of the CNNs can further process the vision data to determine that the corn stalks are, in fact, wilting (e.g., the same CNN that outputs a type of crop (e.g., corn) and a status of the crop (e.g., wilting) or multiple distinct CNN where a first CNN identifies a type of crop (e.g., corn) and a second CNN generates a status of the crop (e.g., wilting)).

Further, GPS data generated by one or more GPS sensors can be utilized to identify local coordinates of the wilting corn stalks with respect to the previously generated local mapping. For example, assume the vision data that is processed to determine that the corn stalks included in the area 699A are wilting corresponds to overhead vision data (e.g., captured by vision components of a drone, low-altitude airplane, satellite, and/or any other vision component that may provide overhead vision data). In this example, metadata associated with the vision data that includes the GPS data can be obtained, and the GPS data can be analyzed to identify local coordinates that include the wilting corn stalks based on the corresponding semantic identifiers (e.g., rows 97-103 $R_{97}$-$R_{103}$ of the NW corn field as captured in the area 699A). As another example, assume the vision data that is processed to determine that the corn stalks included in the area 699A are wilting corresponds to field-level vision data (e.g., captured by vision components of a rover, a vehicle, and/or any other vision component that may provide field-level vision data). In this example, metadata associated with the vision data that includes the GPS data can be obtained and/or the GPS data associated with the vehicle or vision component that captured the GPS data can be obtained, and the GPS data can be analyzed to identify local coordinates that include the wilting corn stalks (e.g., rows 97-103 $R_{97}$-$R_{103}$ of the NW corn field).

In some implementations, a notification 620A can be generated based on the identified event associated with the agricultural field. For example, and as shown in FIG. 6A, the notification 620A of "rows 97-103 of the NW corn field include corn stalks that are wilting" can be visually rendered at the GUI 698 of the client device 610. The notification 620A can additionally or alternatively be audibly rendered via speakers of the client device 610. Further, one or more actions 620A1, 620A3, and/or 630A3 associated with the identified event can be visually rendered at the GUI 698 of the client device 610, and may be selectable to cause a corresponding one of the actions to be performed in response to receiving a selection of a corresponding one of the actions. The one or more actions can include agricultural operations that are determined based on the identified event that is associated with the agricultural field. For example, and as shown in FIG. 6A, the one or more actions may include a first action 650A1 of "send robot to water the wilting corn stalks" to cause a rover (e.g., robot $130_M$ of FIG. 1) to water the wilting corn stalks included in at least the area 699A, a second action 630A2 of "initiate automatic irrigation of NW corn field" to cause an irrigation system to water the NW corn field, and a third action 630A3 of "dismiss" to dismiss the notification 620A. Moreover, in implementations where a time lapse sequence of the NW corn field are available (e.g., vision data that periodically captures the NW corn field), GUI 698 may also include a selectable element 640A that, when selected, enables the user of the client device 610 to view a time lapse sequence of the NW corn field, and rows 97-103 $R_{97}$-$R_{103}$ of the NW corn field that include the wilting corn stalks. The user may subsequently adjust a frequency of automatic irrigation of the NW corn field based on the time lapse sequence. For instance, the user may note that the corn stalks should have been two days prior to a current day. As a result, the user may subsequently cause the irrigation system to water the corn stalks two days earlier for future irrigation cycles of the NW corn field (e.g., from watering the corn stalks every 14 days to watering the corn stalks every 12 days).

As another example, and referring specifically to FIG. 6B, further assume that a plurality of corn stalks of NW corn field are wilting as described with respect to FIG. 6A. In some additional or alternative implementations, the user of the client device 610 can submit a query 650B associated with the agricultural field. For example, further assume the user of the client device 610 submits a query 650B of "how are the corn stalks in the NW corn field?" The vision data described above with respect to FIG. 6A that is associated with NW corn field may be retrieved from one or more databases (e.g., vision data database 122A of FIG. 1) or captured in response to receiving the query 650B. The query 650B can be provided at the client device 610 via spoken input (and optionally in response to receiving user input to activate speech processing components of the client device 610), and/or typed input directed to the text entry field for the query 650B depicted in FIG. 6B. In response to receiving the query 650B, a response 660B can be visually rendered at GUI 698 of the client device 610 (and optionally audibly rendered via speakers of the client device 610). For example, assuming that the plurality of corn stalks of NW corn field are wilting as described with respect to FIG. 6A, the response 660B to the query 650B may indicate that "corn stalks in rows 97-103 of the NW corn field are wilting". In some additional or alternative implementations, directions 670B to the wilting corn stalks may also be provided for presentation to the user of the client device 610. The directions 670B may be generated based on GPS data generated by one or more GPS sensors of the client device 610. For example, assume the user of the client device 610 is walking east along the southern border of the NW corn field and locationally proximate to row 88 of the NW corn field. In this example, the directions 670B may tell the user to "continue walking for 12 rows to reach row 100, the center row of the wilting corn stalks". As a result, the user can easily identify the rows in the agricultural field that include the wilting corn stalks based on the response 660B and/or the directions 670B.

Although FIGS. 6A 6B are described with respect to a wilting event being identified in the NW corn field, it should be understood that is for the sake of example and is not meant to be limiting. For example, the techniques described herein may be utilized to identify any event that may occur in an agricultural field, and notify the user of the client device 610 of the identified event and a location of the event with respect to the previously generated local mapping. Further, the techniques described herein may be utilized to process any query related to the agricultural field with respect to the previously generated local mapping. Accordingly, the local mapping described herein enables the user of the client device 610 to more efficiently perform agricultural operations at the agricultural field associated with the local mapping.

In some implementations, GUI 698 may be operable by a user to interact with a local mapping of an agricultural field to validate the local mapping of the agricultural field. For example, and referring specifically to FIG. 6C, assume a rover (e.g., robot 130$_M$ of FIG. 1) is traversing through the NW corn field (e.g., as shown in portion 699 of GUI 698 of FIG. 6A). Further assume the rover generates a request 680C to validate a current location within the NW corn field. For example, based on GPS data generated by one or more GPS sensors of the rover, the rover can determine the current location with respect to the local mapping (e.g., GPS data that corresponds to row 104 R$_{104}$ of the NW corn field based on the corresponding semantic identifiers). In this example, the request 680C may include "Am I traversing row 104 of the NW corn field?" Further, the user of the client device 610 can physically go to this portion of the NW corn field, or utilize the portion 699 of GUI 698 to determine whether the rover is, in fact, traversing along row 104 R$_{104}$ of the NW corn field.

In some versions of those implementations, one or more selectable elements may be provided to validate the current location of the rover. For example, a validation selectable element 690C1 may be visually rendered at GUI 698, and, when selected, cause the current location of the rover to be validated. Further, an indication that the current location of the rover was validated can be stored in association with the local mapping of the agricultural field to validate the current location of the rover. As another example, an invalidation selectable element 690C2 may be visually rendered at GUI 698, and, when selected, cause the current location of the rover to be invalidated. In implementations when the user selects the invalidation selectable element 690C2, the user of the client device 610 may be provided an option to enter location 690C2A of the rover to correct the local mapping of the agricultural field. For example, assume the request 680C of FIG. 6C requests the user to validate "am I traversing row 103 of the NW corn field", when the rover is, in fact, traversing along row 104 R$_{104}$ as depicted in the portion 699 of GUI 698. In this example, the user of the client device 610 may direct user input to the invalidation selectable element 690C2, and then direct further user input to the enter location 690C2A text field to type "row 104" or provide spoken input of "row 104". In this example, the local mapping may be updated to associate the GPS data of the rover obtained when the request 680C was generated with row 104 R$_{104}$ instead of row 103 R$_{103}$ (and replace existing GPS data associated with row 104 R$_{104}$). In various implementations, the rover can traverse one or more agricultural plots of the agricultural field to validate the local mapping of the corresponding rows in response to receiving user input from the user of the client device 610 to validate the mapping, whereas in other implementations, the rover can traverse one or more agricultural plots of the agricultural field to validate the local mapping of the corresponding rows periodically (e.g., every week, every month, every crop rotations, and/or other periodic intervals).

Although FIG. 6C is described with respect to validating the local mapping of the agricultural field based on GPS data generated by a rover traversing along a row of a given agricultural plot, it should be understood that is for the sake of example and is not meant to be limiting. For example, the local mapping may be validated based on an additional local mapping generated based on additional vision data, and the local mapping may be updated based on differences between the local mapping and the additional local mapping (e.g., as described with respect to validation engine 128 of FIG. 1).

Figure 7:
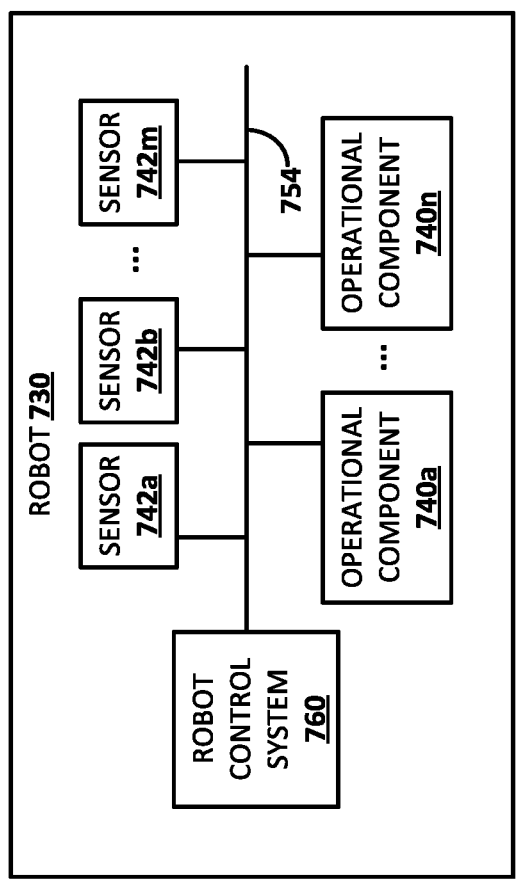
FIG. 7 depicts an example architecture of a robot, in accordance with various implementations.

Turning now to FIG. 7, an example architecture of a robot 730 is schematically depicted. The robot 730 includes a robot control system 760, one or more operational components 740a-740n, and one or more sensors 742a-742m. The sensors 742a-742m may include, for example, vision components, light sensors, pressure sensors, pressure wave sensors (e.g., microphones), proximity sensors, accelerometers, gyroscopes, thermometers, barometers, GPS sensors, IMUs, wheel encoders, and so forth. While sensors 742a-742m are depicted as being integral with robot 730, this is not meant to be limiting. In some implementations, sensors 742a-742m may be located external to robot 730, e.g., as standalone units.

Operational components 740a-740n may include, for example, one or more end effectors and/or one or more servo motors or other actuators to effectuate movement of one or more components of the robot. For example, the robot 730 may have multiple degrees of freedom and each of the actuators may control actuation of the robot 730 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 760 may be implemented in one or more processors, such as a CPU, GPU, and/or other controller(s) of the robot 730. In some implementations, the robot 730 may comprise a "brain box" that may include all or aspects of the control system 760. For example, the brain box may provide real time bursts of data to the operational components 740a-740n, with each of the real time bursts comprising a set of one or more control commands that dictate, inter alia, the parameters of motion (if any) for each of one or more of the operational components 740a-740n. In some implementations, the robot control system 760 may perform one or more aspects of methods 300, 400, and/or 500 described herein.

As described herein, in some implementations all or aspects of the control commands generated by control system 760 in traversing a robotic component to a particular pose can be based on determining that particular pose is likely to result in successful performance of a task, as determined according to implementations described herein. Although control system 760 is illustrated in FIG. 7 as an integral part of the robot 730, in some implementations, all or aspects of the control system 760 may be implemented in a component that is separate from, but in communication with, robot 730. For example, all or aspects of control system 760 may be implemented on one or more computing devices that are in wired and/or wireless communication with the robot 730, such as computing device 810.

Figure 8:
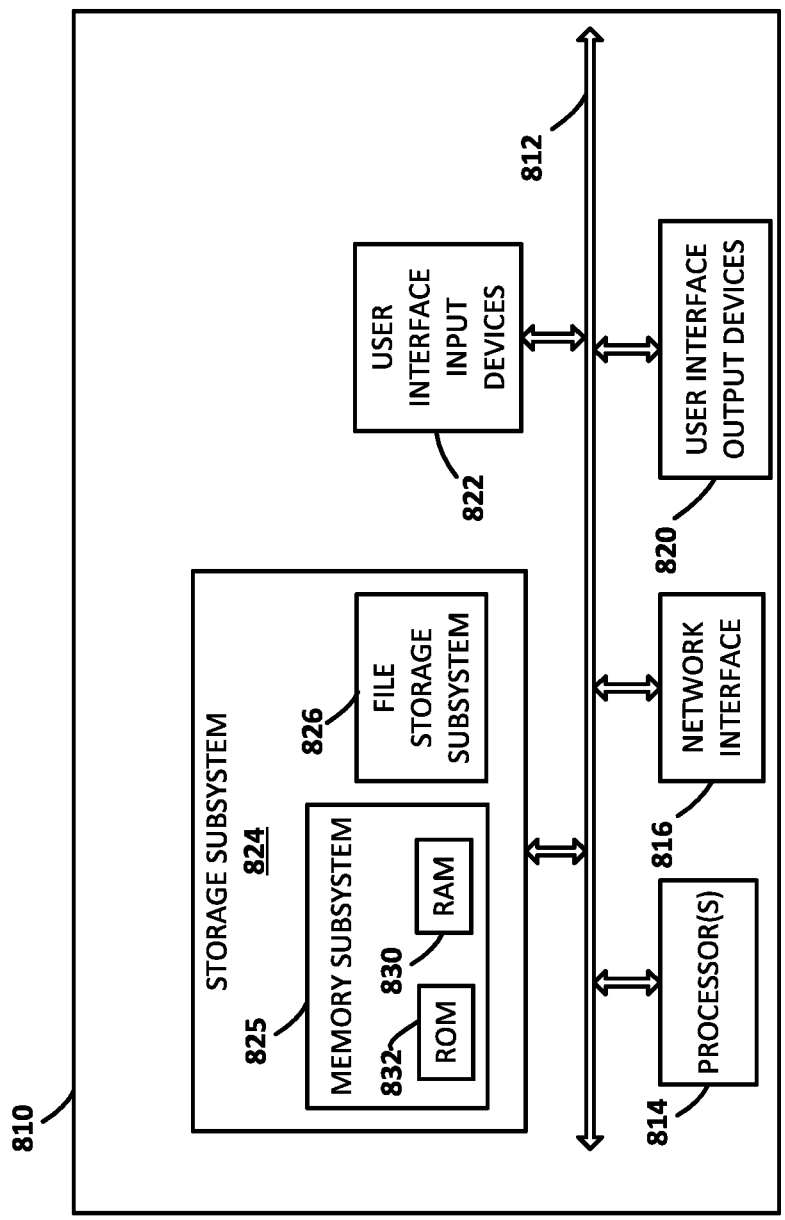
FIG. 8 depicts an example architecture of a computing device, in accordance with various implementations.

Turning now to FIG. 8, a block diagram of an example computing device 810 that may optionally be utilized to perform one or more aspects of techniques described herein is depicted. In some implementations, one or more of a client device, cloud-based automated assistant component(s), and/or other component(s) may comprise one or more components of the example computing device 810.

Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the methods disclosed herein, as well as to implement various components depicted in FIG. 1.

These software modules are generally executed by processor 814 alone or in combination with other processors. Memory 825 used in the storage subsystem 824 can include a number of memories including a main random-access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem 812 may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, and includes obtaining vision data generated by one or more vision components, the vision data capturing at least a portion of an agricultural field, and analyzing the vision data to identify an agricultural plot included in at least the portion of the agricultural field captured by the vision data. The agricultural plot including a plurality of rows, and being associated with a crop. The method further includes obtaining GPS data generated by one or more GPS sensors, the GPS data capturing a plurality of GPS coordinates corresponding to the agricultural field, and assigning a corresponding semantic identifier to each of the plurality of rows. The method further includes generating a local mapping between the GPS data and each of the plurality of rows for the agricultural plot included in the agricultural field, the local mapping including at least the corresponding semantic identifier assigned to each of the plurality of rows. The method further includes, subsequent to generating the local mapping, utilizing the local mapping in performance of one or more agricultural operations.

These and other implementations of technology disclosed herein can optionally include one or more of the following features.

In some implementations, generating the local mapping may further include associating a given portion of the GPS data with a given row, of the plurality of rows, and for the agricultural plot included in the agricultural field.

In some implementations, utilizing the local mapping in performance of one or more of the agricultural operations may include obtaining additional vision data generated by one or more additional vision components, the additional vision data capturing at least the portion of the agricultural field, analyzing the additional vision data to identify an event associated with at least one row of the plurality of rows, generating a notification based on the identified event associated with the at least one row and based on the local mapping, and causing the notification to be rendered at a client device of a user. In some versions of those implementations, the one or more additional vision components may be associated with a vehicle that is operated according to a robotic control policy, and the identified event may be associated with one or more crops of the at least one row.

In some implementations, the method may further include obtaining driving data generated during an episode of locomotion of a vehicle traversing through the agricultural field, and validating the local mapping between the GPS data and each of the plurality of rows based on the driving data generated during the episode of locomotion of the vehicle through the agricultural field.

In some versions of those implementations, validating the local mapping between the GPS data and each of the plurality of rows based on the driving data may include obtaining additional GPS data generated, by one or more additional GPS sensors associated with the vehicle, during the episode of locomotion, the additional GPS data capturing additional GPS coordinates corresponding to the agricultural field, accessing the local mapping between the GPS data and each of the plurality of rows for the agricultural plot, comparing the GPS data associated with each of the plurality of rows traversed during the episode of locomotion to a corresponding portion of the additional GPS data, determining, based on the comparing, whether a difference between the GPS data and the corresponding portion of the additional GPS data satisfies a threshold, and in response to determining the difference fails to satisfy the threshold for the given row, updating the local mapping for the given row.

In some additional or alternative versions of those implementations, validating the local mapping between the GPS data and each of the plurality of rows based on the driving data may include obtaining additional GPS data generated by one or more additional GPS sensors associated with the vehicle during the episode of locomotion, the additional GPS data capturing additional GPS coordinates corresponding to the agricultural field, identifying, based on the local mapping between the GPS data and each of the plurality of rows for the agricultural plot, a current location of the vehicle with respect to the local mapping, generating a request to verify the current location of the vehicle with respect to the local mapping, causing the request to verify the current location of the vehicle with respect to the local mapping to be rendered at a client device of a user, and in response to receiving user input from the user of the client device, validating the local mapping or updating the local mapping based on the user input or further user input.

In some implementations, the one or more vision components may be associated with a satellite, and the vision data generated by the one or more vision components may be satellite vision data, whereas in other implementations, the one or more vision components may be associated with a drone, and the vision data generated by the one or more vision components may be drone vision data.

In some implementations, a method implemented by one or more processors is provided, and includes obtaining driving data generated during an episode of locomotion of a vehicle through an agricultural field, the agricultural field including a plurality rows. The method further includes, during the episode of locomotion of the vehicle, and for each of the plurality of rows: identifying, based on the driving data, a trajectory of the vehicle during the episode of locomotion of the vehicle, obtaining GPS data generated by one or more GPS sensors, the GPS data capturing GPS coordinates corresponding to the agricultural field, associating the GPS data along the identified trajectory with a given row of the plurality of rows, and assigning a corresponding semantic identifier to the given row. The method further includes generating a local mapping between the GPS data and each of the plurality of rows in the agricultural field, the local mapping including the corresponding semantic identifier assigned to each of the plurality of rows. The method further includes, subsequent to generating the local mapping, utilizing the local mapping in performance of one or more agricultural operations.

These and other implementations of technology disclosed herein can optionally include one or more of the following features.

In some implementations, the vehicle may be operated by a user, and the vehicle may include one or more of the GPS sensors. In some versions of those implementations, associating the GPS data along the identified trajectory with the given row may include receiving, via a client device of a user, user input that associates the GPS data along the identified trajectory with the given row. In some further versions of those implementations, the method may further include receiving, via the client device of the user, further user input that assigns the corresponding semantic identifier to the given row. In yet further versions of those implementations, the method may further include receiving, via the client device of the user, yet further user input that assigns an additional corresponding semantic identifier to a given agricultural plot, of a plurality of agricultural plots, that includes the given row, wherein each of the plurality of agricultural plots includes a different crop.

In some implementations, the vehicle may be operated according to a robotic control policy, and the vehicle may include one or more of the GPS sensors. In some versions of those implementations, the method may further include determining, based on the driving data, that the vehicle has transitioned from the trajectory to an additional trajectory during the episode of locomotion of the vehicle. Associating the GPS data along the identified trajectory with a given row may be based on the vehicle transitioning from the trajectory to the additional trajectory. In yet further versions of those implementations, the corresponding semantic identifier may be automatically assigned to the given row based on one or more naming schemas. In even further versions of those implementations, the method may further include assigning an additional corresponding semantic identifier to each of the plurality of agricultural plots included in the agricultural field. The additional corresponding semantic identifier may be automatically assigned to each of the plurality of agricultural plots based on one or more of the naming schemas.

In some implementations, utilizing the local mapping in performance of one or more agricultural operations may include obtaining vision data generated by one or more vision components, the vision data capturing at least the portion of the agricultural field, analyzing the vision data to identify an event associated with at least one row of the plurality of rows, generating a notification based on the identified event associated with the at least one row and based on the local mapping, and causing the notification to be rendered at a client device of a user. In some versions of those implementations, analyzing the vision data to identify an event associated with at least one row of the plurality of rows may include processing, using one or more machine learning models, the vision data to generate output, and identifying, based on the output, an occurrence of the event associated with the at least one row of the plurality of rows. Generating the notification based on the identified event associated with the at least one row and based on the local mapping may be in response to identifying the occurrence of the event.

In some implementations, a method implemented by one or more processors is provided, and includes obtaining GPS data generated by one or more GPS sensors of a vehicle during an episode of locomotion of the vehicle through an agricultural field, the GPS data capturing GPS coordinates corresponding to the agricultural field, identifying, based on a previously generated local mapping of the agricultural field and the GPS data, a current location of the vehicle with respect to the previously generated local mapping, generating a request to validate the current location of the vehicle with respect to the previously generated local mapping, and causing the request to validate the current location of the vehicle with respect to the previously generated local mapping to be rendered at a client device of a user. The method further includes, in response to receiving user input from the user of the client device that validates the previously generated local mapping responsive to the request, storing an indication that validates the previously generated local mapping for a given row of the agricultural field. The method further includes, in response to receiving user input from the user of the client device that invalidates the previously generated local mapping responsive to the request: generating an additional request to update the previously generated local mapping based on the current location of the vehicle, causing the additional request to update the previously generated local mapping of the agricultural field to be rendered at the client device of the user, and causing the previously generated local mapping to be updated for the given row based on further user input from the user of the client device received responsive to the additional request.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

What is claimed is:

1. A method implemented by one or more processors, the method comprising:
   obtaining vision data generated by one or more vision components, the vision data capturing at least a portion of an agricultural field, and the vision data being obtained prior to generating a local mapping of the agricultural field;
   analyzing the vision data to identify an agricultural plot included in at least the portion of the agricultural field captured by the vision data, the agricultural plot including a plurality of rows, and the agricultural plot being associated with a crop;
   obtaining GPS data generated by one or more GPS sensors, the GPS data capturing a plurality of GPS coordinates corresponding to the agricultural field;
   automatically assigning, based on analyzing the vision data and based on a naming schema, a corresponding semantic identifier to at least the agricultural plot and each of the plurality of rows included in the agricultural plot,
      wherein the corresponding semantic identifier that is assigned to the agricultural plot comprises at least an indication of the crop that associated with the agricultural plot, and
      wherein the corresponding semantic identifier that is assigned to each of the plurality of rows included in the agricultural plot comprises at least a corresponding row identifier for a corresponding one of the plurality of rows included in the agricultural plot;
   generating the local mapping, the local mapping being between the GPS data and each of the plurality of rows for the agricultural plot included in the agricultural field, and the local mapping including at least the corresponding semantic identifier assigned to the agricultural plot and each of the plurality of rows included in the agricultural plot; and
   subsequent to generating the local mapping:
      causing the local mapping to be utilized in performance of one or more agricultural operations, wherein causing the local mapping to be utilized in performance of one or more of the agricultural operations comprises:
         causing additional vision data that is generated by one or more additional vision components to be obtained, the additional vision data capturing at least the portion of the agricultural field;
         causing the additional vision data to be analyzed to identify an event associated with at least one crop of at least one row of the plurality of rows;
         causing a notification to be generated based on the identified event associated with the at least one row and based on the local mapping; and
         causing the notification to be rendered at a client device of a user.

2. The method of claim 1, wherein generating the local mapping further comprises:
   associating a given portion of the GPS data with a given row, of the plurality of rows, and for the agricultural plot included in the agricultural field.

3. The method of claim 1, wherein the one or more additional vision components are associated with a vehicle that is operated according to a robotic control policy, and wherein the identified event is associated with one or more crops of the at least one row.

4. The method of claim 1, further comprising:
obtaining driving data generated during an episode of locomotion of a vehicle traversing through the agricultural field; and
validating the local mapping between the GPS data and each of the plurality of rows based on the driving data generated during the episode of locomotion of the vehicle through the agricultural field.

5. The method of claim 4, wherein validating the local mapping between the GPS data and each of the plurality of rows based on the driving data comprises:
obtaining additional GPS data generated, by one or more additional GPS sensors associated with the vehicle, during the episode of locomotion, the additional GPS data capturing additional GPS coordinates corresponding to the agricultural field;
accessing the local mapping between the GPS data and each of the plurality of rows for the agricultural plot;
comparing the GPS data associated with each of the plurality of rows traversed during the episode of locomotion to a corresponding portion of the additional GPS data;
determining, based on the comparing, whether a difference between the GPS data and the corresponding portion of the additional GPS data satisfies a threshold; and
in response to determining the difference fails to satisfy the threshold for a given row, updating the local mapping for the given row.

6. The method of claim 4, wherein validating the local mapping between the GPS data and each of the plurality of rows based on the driving data comprises:
obtaining additional GPS data generated by one or more additional GPS sensors associated with the vehicle during the episode of locomotion, the additional GPS data capturing additional GPS coordinates corresponding to the agricultural field;
identifying, based on the local mapping between the GPS data and each of the plurality of rows for the agricultural plot, a current location of the vehicle with respect to the local mapping;
generating a request to verify the current location of the vehicle with respect to the local mapping;
causing the request to verify the current location of the vehicle with respect to the local mapping to be rendered at a client device of a user; and
in response to receiving user input from the user of the client device, validating the local mapping or updating the local mapping based on the user input or further user input.

7. The method of claim 1,
wherein the one or more vision components are associated with a satellite, and wherein the vision data generated by the one or more vision components comprises satellite vision data; or
wherein the one or more vision components are associated with a drone, and wherein the vision data generated by the one or more vision components comprises drone vision data.

8. The method of claim 1, wherein the notification further includes one or more action graphical user interface elements that are selectable and that, when selected, causes a corresponding action to be performed with respect to the event associated with the at least one crop of at least one row of the plurality of rows.

9. The method of claim 1, wherein the notification further includes a time lapse graphical user interface element that is selectable and that, when selected, causes a time lapse sequence of images of the at least one crop of at least one row of the plurality of rows to be played back at the client device of the user.

10. A method implemented by one or more processors, the method comprising:
obtaining driving data generated during an episode of locomotion of a vehicle through an agricultural field, the agricultural field including a plurality rows, the vehicle including one or more GPS sensors, and the vehicle being driven manually by a user or being driven autonomously according to a robotic control policy;
during the episode of locomotion of the vehicle and prior to generating a local mapping of the agricultural field, and for each of the plurality of rows:
identifying, based on the driving data, a trajectory of the vehicle during the episode of locomotion of the vehicle;
obtaining GPS data generated by one or more of the GPS sensors of the vehicle, the GPS data capturing GPS coordinates corresponding to the agricultural field and along the identified trajectory;
associating the GPS data along the identified trajectory with a given row of the plurality of rows; and
assigning a corresponding semantic identifier to the given row;
generating the local mapping, the local mapping being between the GPS data and each of the plurality of rows in the agricultural field, and the local mapping including the corresponding semantic identifier assigned to each of the plurality of rows during the episode of locomotion; and
subsequent to generating the local mapping:
causing the local mapping to be utilized in performance of one or more agricultural operations, wherein causing the local mapping to be utilized in performance of one or more of the agricultural operations comprises:
causing vision data that is generated by one or more vision components to be obtained, the vision data capturing at least a portion of the agricultural field;
causing the vision data to be analyzed to identify an event associated with at least one crop of at least one row of the plurality of rows;
causing a notification to be generated based on the identified event associated with the at least one row and based on the local mapping; and
causing the notification to be rendered at a client device of a user.

11. The method of claim 10, wherein the vehicle is driven manually by the user.

12. The method of claim 11, wherein associating the GPS data along the identified trajectory with the given row comprises:
receiving, via a client device of a user, user input that associates the GPS data along the identified trajectory with the given row.

13. The method of claim 12, further comprising:
receiving, via the client device of the user, further user input that assigns the corresponding semantic identifier to the given row.

14. The method of claim 13, further comprising:
receiving, via the client device of the user, yet further user input that assigns an additional corresponding semantic identifier to a given agricultural plot, of a plurality of agricultural plots, that includes the given row, wherein each of the plurality of agricultural plots includes a different crop.

15. The method of claim 10, wherein the vehicle is driven autonomously according to the robotic control policy.

16. The method of claim 15, further comprising:
determining, based on the driving data, that the vehicle has transitioned from the trajectory to an additional trajectory during the episode of locomotion of the vehicle; and
wherein associating the GPS data along the identified trajectory with the given row is based on the vehicle transitioning from the trajectory to the additional trajectory.

17. The method of claim 16, wherein the corresponding semantic identifier is automatically assigned to the given row based on one or more naming schemas.

18. The method of claim 17, further comprising:
assigning an additional corresponding semantic identifier to each of a plurality of agricultural plots included in the agricultural field, wherein the additional corresponding semantic identifier is automatically assigned to each of the plurality of agricultural plots based on one or more of the naming schemas.

19. The method of claim 10, wherein causing the vision data to be analyzed to identify an event associated with at least one row of the plurality of rows comprises:
processing, using one or more machine learning models, the vision data to generate output; and
identifying, based on the output, an occurrence of the event associated with the at least one row of the plurality of rows; and
wherein causing the notification to be generated based on the identified event associated with the at least one row and based on the local mapping is in response to identifying the occurrence of the event.

* * * * *